United States Patent
Velev et al.

(10) Patent No.: US 11,356,840 B2
(45) Date of Patent: Jun. 7, 2022

(54) SUSPENDING SERVICES IN A CORE NETWORK

(71) Applicants: Lenovo (Singapore) PTE. LTD., New Tech Park (SG); Genadi Velev, Darmstadt (DE); Apostolis Salkintzis, Athens (GR)

(72) Inventors: Genadi Velev, Darmstadt (DE); Apostolis Salkintzis, Athens (GR)

(73) Assignee: Lenovo (Singapore) PTE. LTD., New Tech Park (SG)

(*) Notice: Subject to any disclaimer, the term of this patent is extended or adjusted under 35 U.S.C. 154(b) by 0 days.

(21) Appl. No.: 16/645,658

(22) PCT Filed: Oct. 17, 2017

(86) PCT No.: PCT/EP2017/076410
§ 371 (c)(1),
(2) Date: Mar. 9, 2020

(87) PCT Pub. No.: WO2019/076439
PCT Pub. Date: Apr. 25, 2019

(65) Prior Publication Data
US 2020/0280836 A1    Sep. 3, 2020

(51) Int. Cl.
*H04W 8/12* (2009.01)
*H04W 88/08* (2009.01)
(Continued)

(52) U.S. Cl.
CPC ........... *H04W 8/12* (2013.01); *H04W 60/005* (2013.01); *H04W 60/06* (2013.01); *H04W 76/16* (2018.02); *H04W 76/19* (2018.02); *H04W 88/085* (2013.01)

(58) Field of Classification Search
CPC ... H04W 60/005; H04W 60/06; H04W 76/16; H04W 76/19; H04W 76/20; H04W 88/085; H04W 8/12
See application file for complete search history.

(56) References Cited

U.S. PATENT DOCUMENTS 8,830,844 B2 * 9/2014 Mathias ............... H04W 36/30
370/242
9,584,553 B2 * 2/2017 Swaminathan ..... H04L 65/1016
(Continued)

FOREIGN PATENT DOCUMENTS

| EP | 2187681 A1 | 5/2010 |
| EP | 2663054 A2 | 11/2013 |
| WO | 2016150491 A1 | 9/2016 |

OTHER PUBLICATIONS

PCT/EP2017/076410, "International Search Report", PCT International Searching Authority, dated Jun. 15, 2018, pp. 1-3.
(Continued)

*Primary Examiner* — Liton Miah
(74) *Attorney, Agent, or Firm* — Kunzler Bean & Adamson

(57) ABSTRACT

Apparatuses, methods, and systems are disclosed for suspending services in a first network while attached to a second network. One apparatus includes a processor and a transceiver configured to communicate with either a first mobile communication network or a second mobile communication network. The processor uses a first service in the first mobile communication network and determines to suspend the first service in order to use a second service in the second mobile communication network. The transceiver sends a first mobility management message indicating that a first registration and the first service are to be suspended and receives a second message as reply to the first MM message, said second message indicating that the first registration and
(Continued)

the first service are successfully suspended. The processor uses the second service in the second core network without using the first service.

20 Claims, 10 Drawing Sheets

(51) Int. Cl.
*H04W 76/16* (2018.01)
*H04W 76/19* (2018.01)
*H04W 60/00* (2009.01)
*H04W 60/06* (2009.01)

(56) References Cited

U.S. PATENT DOCUMENTS

| | | | | |
|---|---|---|---|---|
| 9,973,942 | B2* | 5/2018 | Su | H04W 56/0005 |
| 10,004,004 | B2* | 6/2018 | Mufti | H04W 36/305 |
| 2012/0236709 | A1 | 9/2012 | Ramachandran et al. | |
| 2016/0029228 | A1* | 1/2016 | Mufti | H04W 76/19 |
| | | | | 370/225 |
| 2016/0150497 | A1* | 5/2016 | Janosi | H04W 60/06 |
| | | | | 455/435.1 |
| 2016/0234744 | A1* | 8/2016 | Wu | H04L 65/1069 |
| 2016/0249401 | A1* | 8/2016 | Tanaka | H04M 3/00 |
| 2017/0245318 | A1* | 8/2017 | Rayavarapu | H04W 68/005 |

OTHER PUBLICATIONS

PCT/EP2017/076410, "Written Opinion of the International Searching Authority", PCT International Searching Authority, dated Jun. 15, 2018, pp. 1-5.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.1.0, Sep. 2017, pp. 1-397.

3GPP, "3rd Generation Partnership Project; Technical Specification Group Services and System Aspects; General Packet Radio Service (GPRS); Service description; Stage 2 (Release 14)", 3GPP TS 23.060 V14.5.0, Sep. 2017, pp. 1-367.

3GPP, 3rd Generation Partnership Project; Technical Specification Group Services and System Aspects; Procedures for the 5G System; Stage 2 (Release 15), 3GPP TS 23.502 V1.2.0, Sep. 2017, pp. 1-165.

3GPP, "3rd Generation Partnership Project; Technical Specification Group Services and System Aspects; System Architecture for the 5G System; Stage 2 (Release 15)", 3GPP TS 23.501 V1.4.0, Sep. 2017, pp. 1-151.

* cited by examiner

SUSPENDING SERVICES IN A CORE NETWORK

FIELD

The subject matter disclosed herein relates generally to wireless communications and more particularly relates to suspending services in a first core network while attached to a second core network.

BACKGROUND

The following abbreviations and acronyms are herewith defined, at least some of which are referred to within the following description.

Third Generation Partnership Project ("3GPP"), Access and Mobility Management Function ("AMF"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

The wireless communication systems, a E-UTRAN can connect to both an EPC (e.g., 4G or LTE core network) and a 5G core network ("5GC"). The combination of E-UTRAN and EPC is referred to as the evolved packet system ("EPS"). The combination of 5G-RAN (also referred to as NG-RAN) and 5GC is referred to as the 5G system ("5GS"). Additionally, during a transition period while 5G networks deploy, the 5GC may not support all services enabled in the EPC. For example, to support various deployment scenarios, the 5G system supports fallback procedures towards a E-UTRAN or towards an EPC for providing emergency services.

BRIEF SUMMARY

Methods for suspending services in a first core network while attached to a second core network are disclosed. Apparatuses and systems also perform the functions of the methods. One method (e.g., of a user equipment) for suspending services in a first core network while attached to a second core network includes using a first service in a first core network of a mobile communication network and determining to suspend the first service in order to use a second service in the second core network. Here, using the second service in the second core network may include one of: initiating a service in the second core network that is unavailable in the first core network and transferring to the second core network a service used in the first core network. The method includes sending a first mobility management ("MM") message in response to determining to suspend the first service (in order to use the second service in the second core network) and using the second service in the second core network without using the first service. Here, the MM message indicates that the first service is to be suspended while the remote unit is attached to the second core network.

Another method (e.g., of a mobility management function) for suspending services in a first core network while attached to a second core network includes receiving a message requesting suspension of one or more services (e.g., a first set of services) associated with a remote unit registered with the apparatus and suspending the one or more services (e.g., first set of services), said one or more services remaining in a first core network in a mobile communication network. Suspending the (first set of) one or more services includes preserving data connection context corresponding to the one or more services associated with the remote unit and setting a mobility management state for the remote unit to a state that indicates the remote unit is unreachable. Here, the remote unit is unreachable due to use of a service in a second core network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
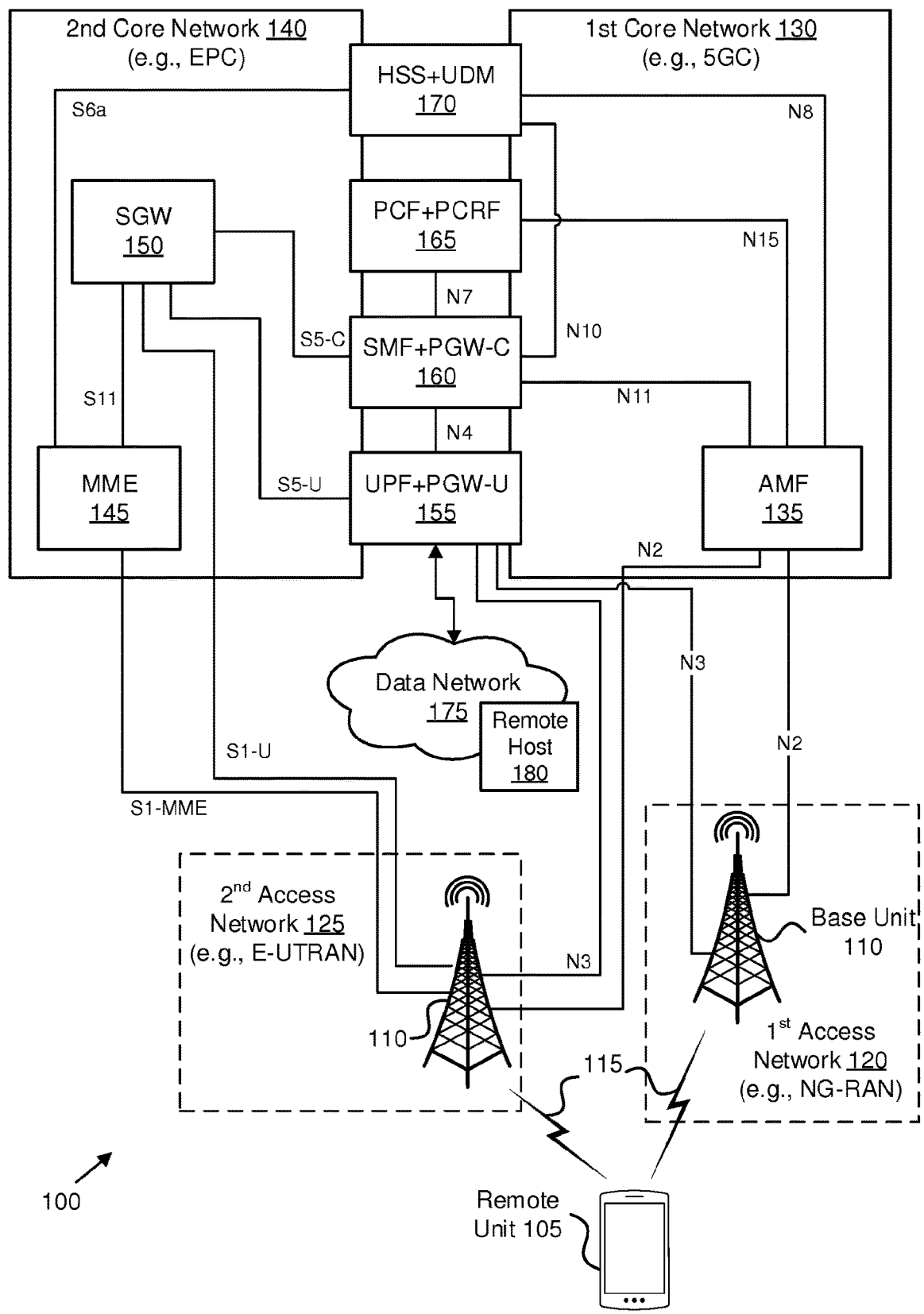
FIG. 1 is a schematic block diagram illustrating one embodiment of a wireless communication system for suspending services in a first core network while attached to a second core network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Generally, the present disclosure focuses on the Interworking procedures between EPC and 5GC in case of a network supporting Dual Registration ("DR") and a UE capable of DR-mode. Further, in terms of radio capability, the UE may be capable of (1) single reception and transmission (single Rx/Tx), (2) single transmission and dual reception (single Tx, dual Rx) and (3) dual reception and dual transmission (dual Rx/Tx). Unless the UE is dual Rx/Tx capable, the UE is only able to connect to (and use services of) one RAT/system at a time, even if configured for DR-mode.

FIG. 1 depicts a wireless communication system 100 for suspending services in a first core network while attached to a second core network, according to embodiments of the disclosure. In one embodiment, the wireless communication system 100 includes at least one remote unit 105, a first access network 120 containing at least one base unit 110, a second access network 125 containing at least one base unit 110, wireless communication links 115 between remote unit 105 and base unit 110, a first core network 130, and a second core network 140. Even though a specific number of remote units 105, access networks 120, 125, base units 110, wireless communication links 115, and core networks 130, 140 are depicted in FIG. 1, one of skill in the art will recognize that any number of remote units 105, access networks 120, 125, base units 110, wireless communication links 115, and core networks 130, 140 may be included in the wireless communication system 100. In various embodiments, the access networks 120, 125 may contain one or more WLAN (e.g., Wi-Fi™) access points ("APs"). Here, the first access network 120, second access network 125, first core network 130 and second core network 140 belong to the same mobile communication network (e.g., the same PLMN).

In one implementation, the wireless communication system 100 is compliant with the 5G system and the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architectures or protocols.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UEs, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 communicate with a remote host 180 (for example, an application server) via a data path that passes through one of the core network 130, 140 and through the data network 175. For example, a remote unit 105 may establish a PDU session (or similar data connection) to the data network 175 via the first core network 130. The first core network 130 then relays traffic between the remote unit 105 and the remote host 180 using the PDU session. As another example, a remote unit 105 may establish a PDN connection to the data network 175 via the second core network 140. The second core network 140 then relays traffic between the remote unit 105 and the remote host 180 using the PDN connection.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the first access network 120 (e.g., NG-RAN) and/or the second access network 125 (e.g., E-UTRAN), that may include one or more controllers communicably coupled to one or more corresponding base units 110. These and other elements of the radio access network are not illustrated, but are well known generally by those having ordinary skill in the art.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

As depicted, the wireless communication system 100 includes both a first core network 130 and a second core network 140 and various interworking network functions for to support interworking between the user plane and certain control plane functions in the first core network 130 and the second core network 140. The first core network 130 includes an Access and Mobility Management Function ("AMF") 135 that is not shared with the second core network 140. Similarly, the second core network 140 includes a Mobility Management Entity ("MME") 145 and a Serving Gateway ("SGW") 150 that are note shared with the first core network 130. However, there is a combined UPF and PGW-user-plane ("UPF+PGW-U") 155, a combined SMF and PGW-control-plane ("SMF+PGW-C") 160, a combined PCF and PCRF ("PCF+PCRF") 165, and a combined HSS and UDM ("HSS+UDM") that support interworking between the first core network 130 and second core network 140. Note that the notions "SMF+PGW-C" and "UPF+PGW-U" are used to show that the network functions used for, e.g., PDU Sessions in 5GC and PDN Connections in EPC are common, in case that IP session continuity is required during transfer of PDU Sessions to PDN Connections and vice-versa. Although specific numbers and types of network functions are depicted in FIG. 1, one of skill in the art will recognize that any number and type of network functions may be included in the mobile core network 130.

As depicted, the wireless communication system 100 includes various network interfaces that facilitate communication among the core network ("CN") elements. For example, a base unit 110 (or RAN) may communicate with the AMF 135 via the N2 interface and with the UPF+PGW-U 155 via the N3 interface. As another example, a base unit 110 may communicate with the MME 145 via the S1-MME interface and with the SGW via the S1-U interface. Other network interfaces are depicted, including, but not limited to, a N4 interface between the UPF+PGW-U 155 and the SMF+PGW-C 160, a N7 interface between the SMF+PGW-C 160 and the PCF+PCRF 165, a N8 interface between the AMF 135 and the HSS+UDM 170, a N10 interface between the SMF+PGW-C 160 and the HSS+UDM 170, a N11 interface between the AMF 135 and the SMF+PGW-C 160, a N15 interface between the AMF 135 and the PCF+PCRF 165, a S5-U interface between the SGW 150 and the UPF+PGW-U 155, a S5-C interface between the SGW 150 and the SMF+PGW-C 160, a S6a interface between the MME 145 and the HSS+UDM 170, and the S11 interface between the MME 145 and the SGW 150. Although not depicted, the wireless communication system 100 may support a N1 interface between the remote unit 105 and the AMF 135.

Note, however, that there is no network interface between the AMF 135 and the MME 145. This is because the AMF 135 and the MME 145 are not communicatively coupled. Accordingly, inter-system handover from the 5GC to EPC (or vice versa) is not supported. Disclosed herein are various mechanisms to allow a DR-capable remote unit 105 to fallback from the 5GC towards the EPC. Because such a remote unit 105 supports DR-mode operations, it is unnecessary for the remote unit 105 to deregister from the 5GC (e.g., first core network 130) in order to register with and use services in the EPC (e.g., second core network 140). However, unless the access stratum (e.g., radio layer) of the remote unit 105 is capable of dual Rx and dual Tx ("dual Rx/Tx"), the remote unit 105 cannot simultaneously use services in both the first core network 130 and the second core network 140. Accordingly, the remote unit 105 is unable to receive and/or respond to paging or any other downlink signaling from a first system while connected to another system.

Moreover, when the remote unit 105 operates in DR-mode and is using service in a first system (e.g., first RAT and first CN), if the second system (e.g., second RAT and second CN) is unaware that the remote unit 105 is using services in the first system, then the second system may page the remote unit 105 in vain, leading to inefficient use of network/radio resources. To avoid paging a remote unit 105 that cannot receive/respond due to using services in another system, the first core network 130 and second core network 140 synchronize the mobility management ("MM") states of the remote unit, as described in detail below.

When a remote unit 105 is registered to the first core network 130 (e.g., a 5GC) and wants to initiate a service which is not supported by the first core network 130 (e.g., 5GC), then the remote unit 105 operating in dual-registration mode attempts to fallback to the second core network 140 (e.g., a EPC). One example of a fallback to the second core 140 is an Emergency services fallback. Where the remote unit 105 is not able to simultaneously transmit data in multiple RATs (e.g., the remote unit 105 is single Tx capable), then the remote unit 105 attempts to suspend services in the first core network 130 (e.g., suspend PDU Sessions in 5GC), as follows:

If a remote unit 105 is in CM-IDLE state in the first core network 130 (e.g., 5GC) then the remote unit 105 may initiate an Attach procedure (or TAU procedure) with the second core network 140 (e.g., EPC) and indicates to the second core network 140 (e.g., EPC) that services in the first core network 130 (e.g., 5GC) should be suspended. The MME 145 forwards the suspension request to the HSS+UDM 170 during subscription information retrieval. In turn, the HSS+UDM 170 notifies the AMF 135 that 5GC services (e.g., in the first core network 130) should be suspended for this remote unit 105 (e.g. because the remote unit 105 is unreachable until it performs Registration procedure with the first core network 130 (e.g., 5GC)).

If the remote unit 105 is in CM-CONNECTED state in the first core network 130 (e.g., 5GC), the remote unit 105 requests first suspension of the first core network 130 (e.g., 5GC) services using NAS signaling and the first core network 130 (e.g., 5GC) releases the N1 and N2 connections, and the remote unit 105 becomes unreachable until the remote unit 105 performs Registration procedure with the first core network 130 (e.g., 5GC). Afterwards the remote unit 105 initiates Attach/TAU procedure with the second core network 140 (e.g., EPC).

Figure 2:
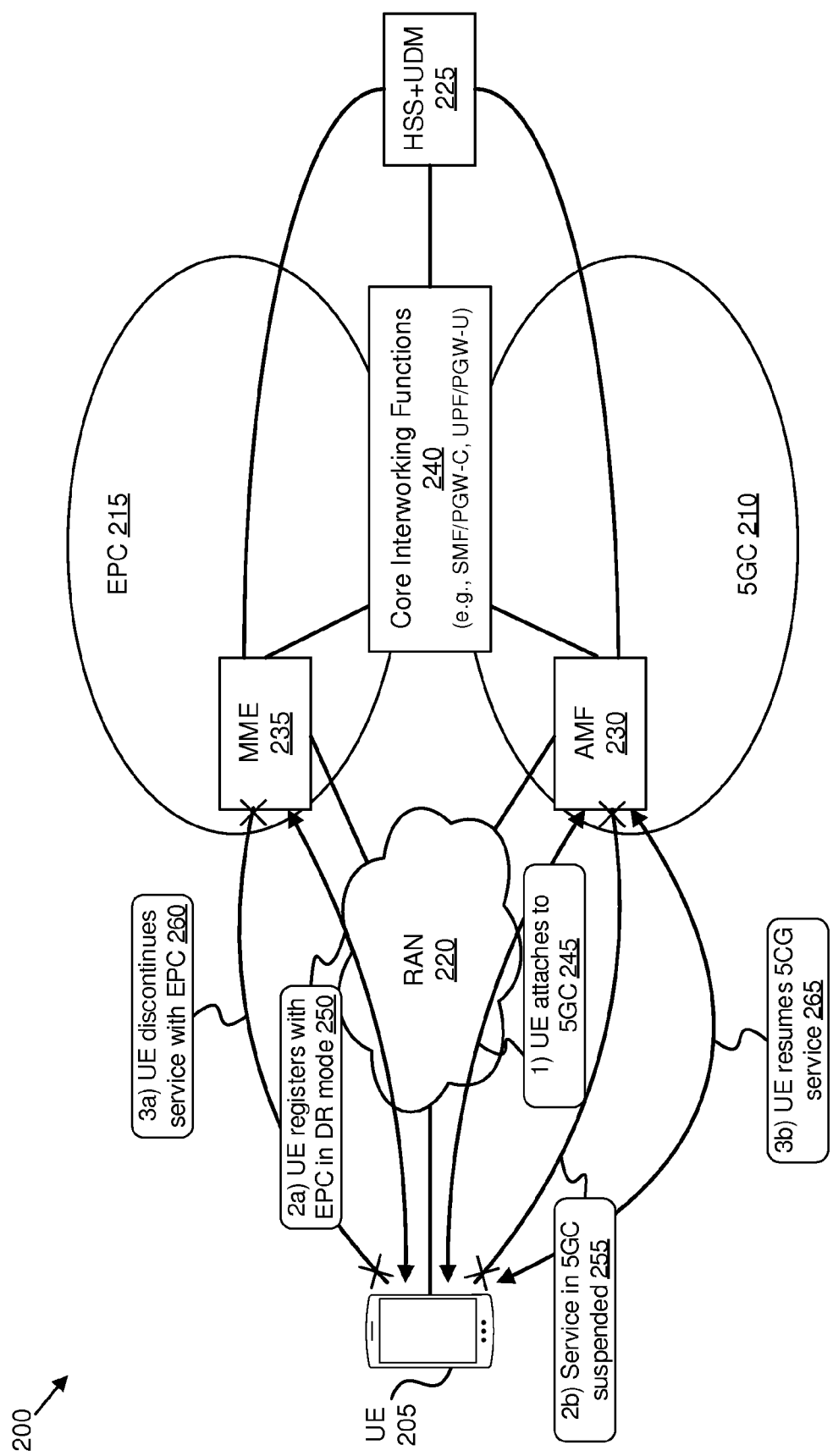
FIG. 2 is a block diagram illustrating one embodiment of a network architecture for suspending services in a first core network while attached to a second core network.

FIG. 2 depicts a network architecture 200 used for suspending services in a first core network while attached to a second core network, according to embodiments of the disclosure. The network architecture 200 may be a simplified embodiment of the wireless communication system 100. As depicted, the network architecture 200 includes a UE 205 that communicates with a 5GC 210 and with a EPC 215 via a RAN 220. The UE 205 may be one embodiment of the remote unit 105, the 5GC 210 may be an embodiment of the first core network 130, and the EPC 215 may be an embodiment of the second core network 140. Additionally, the network architecture 200 includes multiple core interworking functions 240, such as a SMF/PGW-C interworking function, a UPF/PGW-U interworking functions, etc. Although shared by the 5GC 210 and the EPC 215, the HSS+UDM is depicted as separate from the core interworking functions 240.

In the depicted embodiment, the 5GC 210 and EPC 215 belong to the same PLMN; however, inter-core handover is not supported between the AMF 230 and the MME 235. Moreover, the RAN 220 broadcasts an indication in the system information (e.g., SIB) that the PLMN supports DR-mode. Here, the UE 205 is configured to operate in DR-mode, but is not capable of both dual Rx and dual Tx (e.g., it is a single radio UE).

The UE 205 initially attaches to the 5GC 210 by communicating with an AMF 230 in the 5GC 210 (see signaling 245). The AMF 230 may be one embodiment of the AMF 135 discussed above. The AMF 230 retrieves subscription information for the UE 205 from the HSS+UDM 225 (e.g., an embodiment of the HSS+UDM 170) and the 5GC 210 begins providing services to the UE 205. As used herein, a core network providing "services" to a UE refers to layers above the non-access stratum ("NAS"). Each "service" is supported by a data connection or bearer, such as a PDU Session in the 5GC 210 or a PDN Connection in the EPC 215. A single data connection or bearer may support one or more services. Thus, one or more services correspond to a PDN Connection or PDU Session.

If the 5GC 210 does not support specific service (e.g., Emergency services over IMS) and the UE 205 is registered with the 5GC 210 (e.g. as a data-centric UE), there is a need of fallback procedure from the 5GC 210 to the EPS 215. If the UE 205 is in CM-IDLE mode in the 5GC 210 at the time it determines to initiate a service (e.g., emergency service) in the EPC 215, then it can immediately begin an attach procedure with the EPC 215. However, if the UE 205 is in CM-CONNECTED mode in the 5GC 210 at the time it determines to initiate the service in the EPC 215, then it does not need to deregister with the 5GC 210 (due to being DR capable), but it still needs to gracefully release the connection to the AMF 230 prior to attaching to the EPC 215.

Recall that unsynchronized states in the 5GC 210 and the EPC 215 can result in one core network, such as the 5GC 210, performing MT signaling (e.g., paging) to the UE 205 in vain while it is using services in the EPC 215 and unable to respond. To avoid unnecessary states, the UE 205 informs the 5GC 210 that it is attaching to the EPC 215 and to suspend the services with the 5GC 210. Doing so allows the 5GC 210 to set the MM state of the UE 205 to a state that indicates the UE 205 is unreachable (due to using services in the EPC 215). The UE 205 may request to suspend services in the 5GC 210 based on the radio capabilities from lower layers (e.g. radio layer, or based on indication from RRC layer to NAS layer).

In the depicted embodiment, the UE 205 registers with the EPC 215 in DR mode (see signaling 250). DR-mode permits the UE 205 to simultaneously be registered in both the 5GC 210 and the EPC 215. However, because the UE 205 in unable to use services in the 5GC 210 and the EPC 215 at the same time, when registering with the EPC 215 the UE 205 includes an indication to suspend services in 5GC (see block 255). Here, the MME 235 receives the indication from the UE 205 and passes it to the HSS+UDM 225, which in turn informs the AMF 230. Note that the depicted embodiment assumes that the UE 205 is in CM-IDLE mode when it determines to connect to the EPC 215. Where the UE 205 is already in the CM-CONNECTED mode, the UE 205 will first release the connection to the AMF 230 before attaching to the EPC 215. Here, the UE 205 includes an indication to suspend services in 5GC when releasing the connection to the AMF 230. When suspending the 5GC 210 services, the AMF 230 deactivates (release) UP resources (and signaling associations) for active data connections of the UE 205, but does not release corresponding SMF contexts.

At some later point in time, the UE 205 finishes using the services in the EPC 215 and releases the connection to the MME 235 (see signaling 260). In some embodiments, the UE 205 terminates services in the EPC 215 that are not available in the 5GC 210. In certain embodiments, the UE 205 suspends services in the EPC 215 in order to resume service in the 5GC 210. In other embodiments, the UE 205 transfers one or more services from the EPC 215 back to the 5GC 210 when resuming services in the 5GC 210. In any case, the AMF 230 re-activates UP resources (and signaling associations) corresponding to the suspended services, and the UE 205 resumes using services in the 5GC (see signaling 265).

Figure 3:
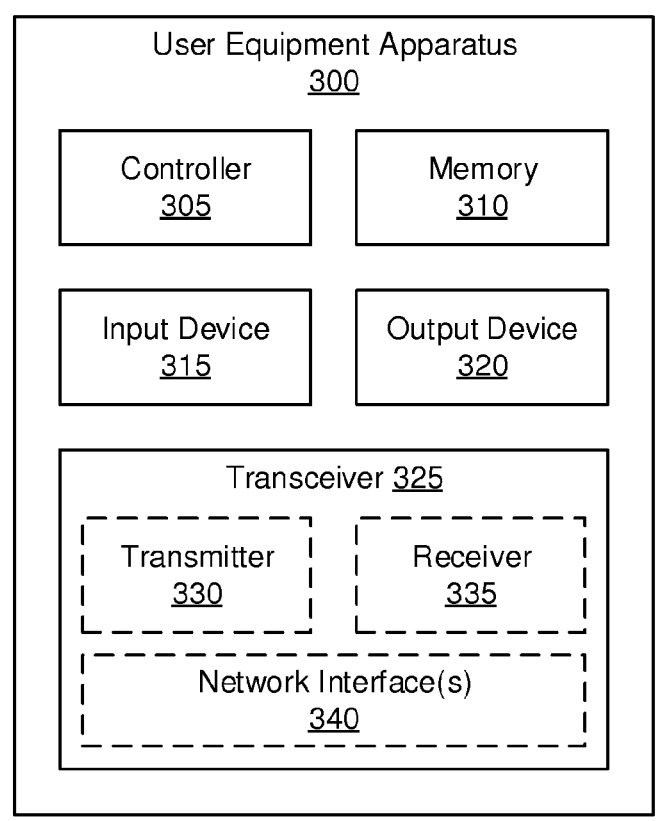
FIG. 3 is a schematic block diagram illustrating one embodiment of a user equipment apparatus for suspending services in a first core network while attached to a second core network.

FIG. 3 depicts one embodiment of a user equipment apparatus 300 that may be used for suspending services in a first core network while attached to a second core network, according to embodiments of the disclosure. The user equipment apparatus 300 may be one embodiment of the SMF 146. Furthermore, the user equipment apparatus 300 may include a processor 305, a memory 310, an input device 315, a display 320, and a transceiver 325. In some embodiments, the input device 315 and the display 320 are combined into a single device, such as a touch screen. In certain embodiments, the user equipment apparatus 300 may not include any input device 315 and/or display 320.

As depicted, the transceiver 325 includes at least one transmitter 330 and at least one receiver 335. Additionally, the transceiver 325 may support at least one network interface 340. Here, at least the network interface 340 facilitates communication with a eNB or gNB (e.g., using the Uu interface). Additionally, the at least one network interface 340 may include an interface used for communications with an AMF (e.g., using a N1 interface). The transceiver 325 configured to communicate with a first core network of a mobile communication network or a second core network of the mobile communication network, but only communicates one core network at a time. In various embodiments, the user equipment apparatus 300 is a UE capable of dual registration with the first and second core networks, but the transceiver 325 is incapable of both dual reception and dual transmission with the first and second core networks.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 determines to suspend one or more first service (e.g., a first set of services) in order to use a second service in a second core network 140 (e.g., a EPC), while currently attached to a first core network 130 (e.g., while using the at least one first service in a 5GC). Accordingly, the processor 305 controls the transceiver to send a first mobility management ("MM") message. Here, the MM message indicates that the first set of services (e.g., one or more first services remaining in the first core network 130) are to be suspended while the user equipment apparatus 300 is attached to the second core network 140 (e.g., to the EPC 215). Moreover, the processor 305 uses the second service in the second core network 140 without using the first set of services (e.g., services suspended in the 5GC 210).

Here, using the second service in the second core network 140 includes one of: initiating a (new) service in the second core network 140 that is unavailable in the first core network 130 and transferring to the second core network 140 at least one third service (e.g., a third set of services) used in the first core network 130. Note that the third set of services is distinct from the first set of services. Accordingly, some services may be transferred to the second core network 140 (e.g., EPC 215) while all remaining services in the first core network 130 are suspended. In various embodiments, the processor 305 preserves data connection context associated with the one or more first services remaining in the first core network 130 (e.g., the first set of services) while using the second service in the second core network 140. Moreover, determining to suspend the first service may include the processor 305 performing internal suspension of the first service. Note, that if in CONNECTED state the user equipment apparatus 300 needs first to receive the Suspend Ack or N1 release from the AMF 230 before internally suspending a 5G service.

In certain embodiments, the processor 305 receives a request for a second service (e.g., an internal request from an application running on the user equipment apparatus 300) and determines to initiate the second service in the second core network. The processor 305 then configures the transceiver 3235 to communicate with the second core network (e.g., in response to determining to initiate the second service in the second core network) and sends a message to initiate the second service in the second core network. Here, the message sent to the second core network indicates that communication with the first core network is to be suspended.

In some embodiments, the user equipment apparatus 300 is in an idle state with respect to the first core network 130 and the first MM message is a NAS MM message that is sent to the second core network 140 while in the idle state. To do so, the processor 305 may configure the transceiver 325 to communicate with the second core network 140 (e.g., to use a radio access technology ("RAT") of a radio access network ("RAN") connected to the second core network 140). Here, the NAS MM message indicates that a registration with the first core network 130 is not to be cancelled. Accordingly, the user equipment apparatus 300 operates in DR-mode in response to the NAS MM message.

For example, a NAS MM Attach message may include a parameter indicating it is not an "initial" attach, such that the HSS+UDM 225 understands that the user equipment apparatus 300 is operating in dual registration mode. As another example, the NAS MM Attach message may lack the indication of an "initial" attach, implicitly signaling that the user equipment apparatus is operating in DR-mode. In various embodiments, the NAS MM message may be an attach request, a tracking area update request, or a service request.

In certain embodiments, the NAS MM message sent to the second core network 140 further includes an indication to suspend services (e.g., the first set) in the first core network 130. In other embodiments, the service suspension is implied by the NAS MM message. When suspending the one or more first services, data connection contexts associated with these services (e.g., those remaining in the first core network) are preserved (e.g., are not deleted). In some embodiments, the NAS MM includes a request to transfer at least one data connection from the first core network 130 to the second core network 140. For example, the processor 305 may determine to transfer the at least one data connection that does not correspond to the suspended first services.

In other embodiments, the user equipment apparatus 300 is in an idle state with respect to the first core network 130 and the MM message is a NAS MM message that is sent to the first core network 130 while in the connected state. Here, the NAS MM message requests suspension of the first set of services (remaining) in the first core network 130. In certain embodiments, the NAS MM message includes a cause parameter which indicates that the user equipment apparatus 300 requires the second service in the second core network 140 that is unavailable in the first core network 130 (e.g., such as Emergency Services).

In certain embodiments, the processor 305 later determines to discontinue the second service (e.g., used in the second core network 140). For example, if the processor 305 previously determined to use Emergency Services in the second core network 140 that were not available in the first core network 130, then determining to discontinue service in the second core network 140 may occur in response to terminating use of the Emergency Services. Note, however, that there may be one or more remaining services in the second core network 140 which may be terminated or may be suspended, referred to as a fourth set of services. Here, the processor 305 releases connections to the second core network 140 while keeping DR-mode operation. With service suspension in the second core network 140, the processor 305 may store data connection context (e.g., PDN Connection context) in the memory 310 (said context also kept in the second core network 140).

Moreover, to resume service in the first core network 130 (e.g., resuming the first set of services), the processor 305 may send, to the first network core 130, a second MM message. This second MM message may be one of: a registration request message, a tracking area update request, an attach request, and a service request message to the first core network 130 (e.g., to a AMF 135 in the first core network 130). Here, the service request message indicates the services remaining in the first core network 130 which are to be resumed (e.g., the first set of services). In one embodiment, the registration request message also indicates (to the AMF 135) which of the first set of services are to be resumed (e.g., due to the memory 310 storing a valid SM context). In certain embodiments, the registration/service request indicates which data connections (e.g., PDU Sessions or PDN Connections) corresponding to the first set of services are to be resumed. Further, the processor 305 resumes using the first set of services in response to the first core network 130 (e.g., the AMF 135) responding to the second MM message.

In certain embodiments, the processor 305 requests transfer of at least one data connection from the first core network 130 to the second core network 140, when initiating the second service in the second core network 140 (e.g., that is unavailable in the first core network 130). Note, that the at least one data connection to be transferred correspond to the above mention third services, but does not correspond to the suspended first set of services. In one embodiment, the processor 305 determines to suspend at least one fourth service remaining in the second core network 140 in response to determining to discontinue the second service in the second core network 140. Note that the at least one fourth service may include one of the third services transferred to the second core network 140. In other words, the third set of services and the fourth set of service may overlap.

In another embodiment, the processor 305, in response to determining to discontinue the second service in the second core network 140, further determines to transfer at least one (fourth) service remaining in the second core network 140 to the first core network 130. In such an embodiment, resuming use of the first set of services may further include using the at least one service transferred from the second core network 140 to the first core network 130. Note, that a service transferred to the second core network 140 from the first core network 130 may be transferred back to the first core network 130 upon the processor 305 determining to discontinue the second service.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to suspending services in a core network, for example storing PDU Session contexts, PDN Connection contexts, and the like. In certain embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with one or more network functions of a mobile communication network. The transceiver 325 operates under the control of the processor 305 to transmit messages, data, and other signals and also to receive messages, data, and other signals. For example, the processor 305 may selectively activate the transceiver (or portions thereof) at particular times in order to send and receive messages. The transceiver 325 may include one or more transmitters 330 and one or more receivers 335.

Figure 4:
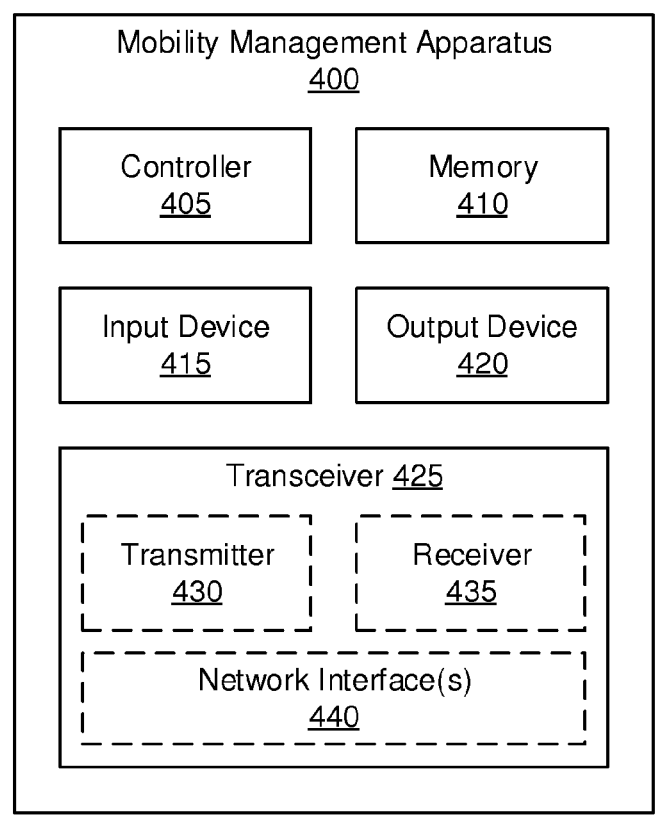
FIG. 4 is a schematic block diagram illustrating one embodiment of a network function apparatus for suspending services in a first core network while attached to a second core network.

FIG. 4 depicts one embodiment of a mobility management apparatus 400 that may be used for suspending services in a first core network, according to embodiments of the disclosure. The mobility management apparatus 400 may be one embodiment of the AMF 135, the AMF 230, the MME 145, and/or the MME 235. Furthermore, the mobility management apparatus 400 may include a processor 405, a memory 410, an input device 415, a display 420, and a transceiver 425. In some embodiments, the input device 415 and the display 420 are combined into a single device, such as a touch screen. In certain embodiments, the mobility management apparatus 400 may not include any input device 415 and/or display 420.

As depicted, the transceiver 425 includes at least one transmitter 430 and at least one receiver 435. Additionally, the transceiver 425 may support at least one network interface 440. Here, the network interface 440 facilitates communication with one or more a network function, such as the SMF+PGW-C 160, PCF+PCRF 165, and HSS+UDM 170. Additionally, the at least one network interface 440 may include an interface used for communications with an RAN, such as the NG-RAN or E-UTRAN. Specific interfaces are discussed above with reference to FIG. 1.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the transceiver 425 receives a message requesting suspension of one or more services associated with a remote unit 105, such as the UE 205, registered with the mobility management apparatus 400. In response, the processor 405 may suspend the one or more services (e.g., the first set of services described above). Here, suspending the one or more services includes the processor 405 preserving data connection context corresponding to the one or more services associated with the remote unit 105, said one or more services remaining in a first core network in a mobile communication network. In various embodiments, the mobility management apparatus 400 is located in (e.g., is a part of) the first core network.

For example, the processor 405 may store the data connection (e.g., PDU Session) context in a non-volatile portion of the memory 410. As another example, the processor 405 may flag the memory locations where the data connection contexts to prevent their erasure or being overwritten. In yet another example, the processor 405 treats the data connection context as active contexts despite the corresponding services being suspended.

Moreover, suspending the one or more services includes the processor 405 setting a mobility management state for the UE 205 to a state that indicates the UE 205 is unreachable. For example, the state may be a "UE unreachable" state that is a subset of the "CM-IDLE" state. Such an "UE unreachable" state causes the mobility management apparatus 400 to forgo paging the UE 205 and other MT signaling, thereby conserving network and radio resources. Here, the UE 205 is unreachable due to use of a service in a second core network (e.g., EPC 215). In one embodiment, the first core network is a 5GC and the second core network is a EPC. In another embodiment, the first core network is a EPC and the second core network is a 5GC.

In certain embodiments, setting the mobility management state for the UE 205 to the state that indicates the UE 205 is unreachable includes the processor 405 notifying a session management network function in the first core network that the remote unit is unreachable. Alternatively, the processor 405 may notify a SMF+PGW-C 160 node that the remote unit is unreachable. While the mobility management state for the UE 205 is set to "unreachable," the transceiver 425 may receive a service request message, such as from a SMF+PGW-C 160, that requests activation of user plane network resources for the suspended services (of the UE 205). In such embodiments, the processor 405 controls the transceiver 425 to respond to the service request with an indication that the UE 205 is unreachable. In certain embodiments, the indication may be a cause parameter in a response rejecting the service request. Note that upon receiving the indication, the SMF-PGW-C 160 may set the UE SM state of the UE 205 to an "UE unreachable" state or similar SM state.

In some embodiments, the processor 405 further releases a signaling association with the UE 205 and also releases user plane network resources in the first core network (e.g., 5GC 210) corresponding to the one or more services associated with the UE 205, in response to the message requesting suspension of the one or more services. For example, the processor 405 may initiate a connection release procedure, such as the "NAS signaling connection release" procedure in order to release the signaling association and user plane network resources.

In certain embodiments, the message requesting suspension of one or more services is a subscriber data update notification message from a subscription database common to the first and second core networks. For example, the HSS+UDM 170 may send the message to the mobility management apparatus 400. Moreover, the message may invoke the "Nudm_SubscriberDataManagement_UpdateNotification" procedure in order to update the mobility management apparatus 400 with changes made in the subscriptions stored at the HSS+UDM 170. Here, the subscriber data update notification message informs the mobility management apparatus 400 that the UE 205 has switched to the second core network (e.g., EPC 215), thereby causing the processor 405 to suspend the services in the first core network (e.g., 5GC 210). Generally, the mobility management apparatus 400 receives the service suspension message from the HSS+UDM 170 when the UE 205 transitions to the second core network while in an idle state for the first network core, for example where its MM state is the "CM-IDLE" state.

In certain embodiments, the message requesting suspension of one or more services is a NAS MM message from the remote unit. Here, the NAS MM message includes a cause parameter indicating that the UE 205 requires the service in the second core network, e.g., that is unavailable in the first core network. In certain embodiments, the message requesting suspension of one or more services is a resource release request message, such as a N2 Release Request, from a radio access network (e.g., RAN 220) to which the UE 205 is attached. Here, the resource release request message requests the suspension due to the UE 205 switching to the second core network.

At a later point in time, the transceiver 425 may receive a second NAS MM message from the UE 205 causing the processor 405 to resume the one or more services remaining in the first core network. In one embodiment, the second NAS MM message is a registration request received from the UE 205 when the UE 205 transitions back to the first core network (e.g., 5GC 210). In another embodiment, the second NAS MM message is a service request message received from the UE 205 when the UE 205 transitions back to the first core network (e.g., 5GC 210). In certain embodiments, the second NAS MM message may indicate the one or more services remaining in the first core network that are to be resumed. For example, the registration request message may include a Packet Data Unit ("PDU") Session status indication for a PDU session corresponding to a suspended service in the first core network. Here, the processor 405 resumes (e.g., reactivates) the service remaining in the first core network corresponding to the PDU Session status indication contained in the registration request message.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to suspending services in a first core network, for example storing policy rules, service rules, service contexts, and the like. In certain embodiments, the memory 410 also stores program code and related data, such as an operating system or other controller algorithms operating on the mobility management apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435.

Figure 5A:
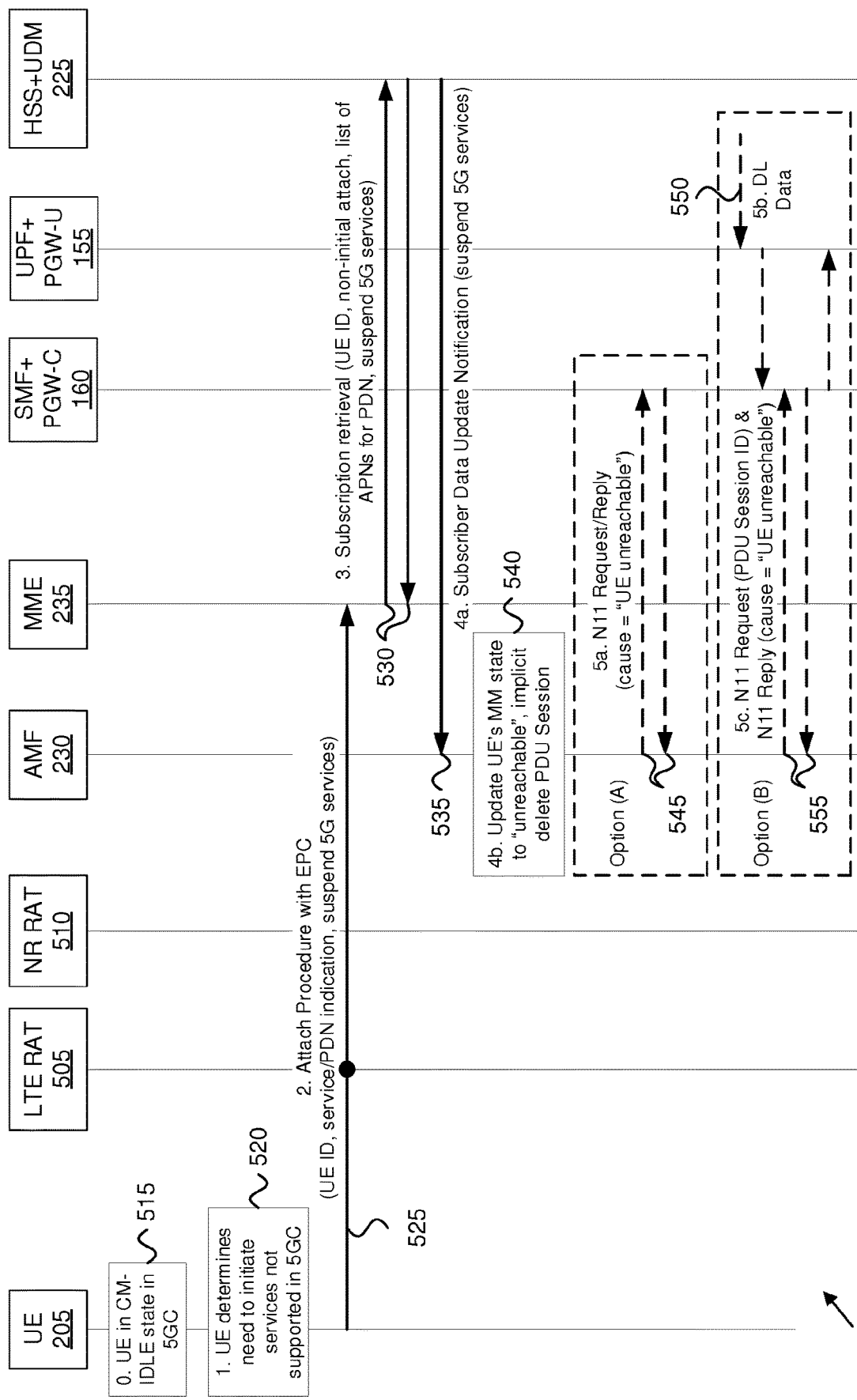
FIG. 5A is a block diagram illustrating one embodiment of a network procedure for suspending services in a first core network for a dual-registered UE.
Figure 5B:
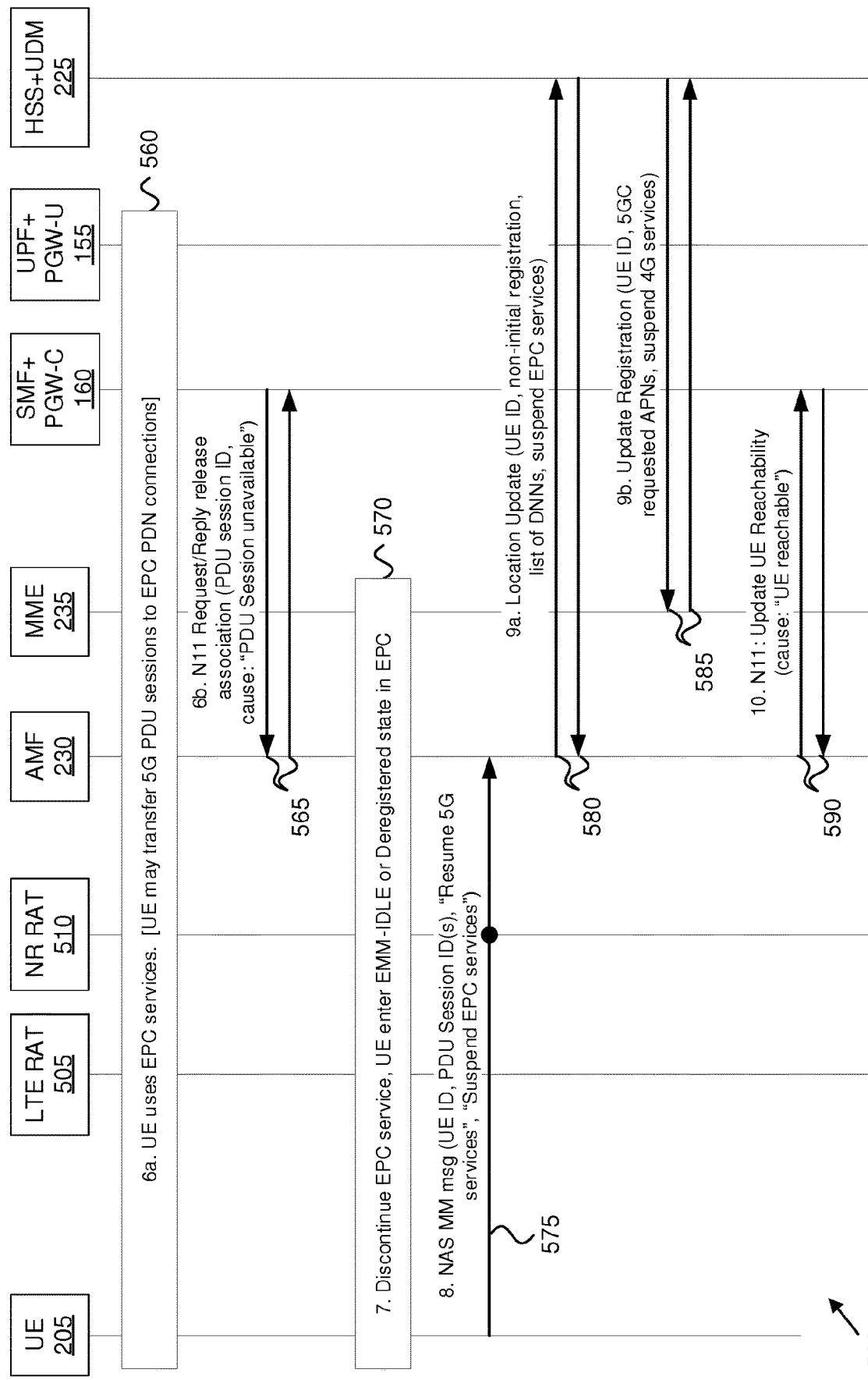
FIG. 5B is a continuation of the network procedure of FIG. 5A.

FIGS. 5A and 5B depict a network procedure 500 for suspending services in a first core network for a dual-registered UE, according to embodiments of the disclosure. The network procedure 500 involves the UE 205, the AMF 230, the MME 235, the SMF+PGW-C 160, the UPF+PGW-U 155, and the HSS+UDM 225. Also involved are two radio access technologies (RAT): the LTE RAT 505 (e.g., the EUTRAN) and the NR (5G) RAT 510. As discussed above, with reference to FIG. 2, the AMF 230 is a component of the 5GC 210 (not depicted) and the MME 235 is a component of the EPC 215 (not depicted).

At FIG. 5A, the network procedure 500 begins as the UE 205 is registered with a first system, here with the 5GC 210 via a NR RAT 210. In the network procedure 500, the UE 205 is in a CM-IDLE state in the 5GC 210 (see block 515). Note that the NAS layer of the UE 205 maintains all states for CM-IDLE state. Similarly, the AMF 230 also stores the UE 205 state in the 5GC 210 as CM-IDLE.

At a first point in time, the UE 205 determines that registration with a second system (e.g. with EPC 215 via the LTE RAT 505) is needed. For example, the UE 205 may require a service (e.g., emergency services) that is available in the EPC 215 but is not supported in the 5GC 210 (see block 520). As the UE 205 is DR-mode capable, the UE 205 is able to perform attach with the EPC 215 without deregistering with the 5GC 210 (e.g., in order to setup services which are not supported in the 5GC 210).

Additionally, the UE 205 determines whether to request that the services in the first system (e.g. 5GC 210) be suspended. When services are suspended the UE 205 is not able to receive those services temporarily, but the PDU Session contexts corresponding to the suspended services are not deleted. In one embodiment, the UE 205 determines to suspend services in the 5GC 210 because the UE 205 is incapable of both dual reception (e.g., simultaneous reception over two RATs, abbreviated "dual Rx") and dual transmission (e.g., simultaneous transmission over two RATs, abbreviated "dual Tx"). In another embodiment, the UE 205 is dual Rx/Tx capable, but determines to suspend services in the first system (here, the 5GC 210), e.g., to conserve battery life.

Accordingly, the UE 205 configures its radio to use the LTE RAT 505 and initiates an Attach procedure with the MME 235 in the EPC 215 (see signaling 525). When attaching to the EPC 215, the UE 205 does not indicate an 'initial' attach (or similar indication) in order to let the MME 235 know that the UE 205 is coming from the 5GC 210 and that the registration at the 5GC 210 is not to be cancelled (thus, the UE 205 is operating in DR-mode). Alternatively, the UE 205 may instead initiate a Tracking Area Update ("TAU") procedure, for example where the UE 205 is connected to the 5GC 210 via an E-UTRAN (e.g., using the LTE RAT 505). Because in the TAU procedure the UE 205 uses a temporary ID (e.g., a GUTI) for the EPC 215 derived from its temporary ID (GUTI) in the 5GC 210, the MME 235 determines from the TAU procedure that the UE 205 is coming from the 5GC 210.

Additionally, the UE 205 determines whether to include an indication that the services in the first system (e.g. 5GC) can be suspended. In the depicted embodiment, the Attach request includes a parameter (indication) labeled 'suspend 5G services'; however, other names expressing same/similar meanings may be used in other embodiments.

In one embodiment, the UE 205 includes the 'suspend 5G services' indication because the NAS layer is aware that the radio layer is incapable of both dual Rx and dual Tx, and thus the 4G/EPC NAS protocol stack decides to include the '5G services suspended' indication. In another embodiment, the UE 205 performs attach procedure with EPC 215 without establishing PDN Connections in the EPC 215. Here, the UE does not include the 'suspend 5G services' as the UE 205 only attaches to EPC 215 system, but no services are established in EPC 215 and after the Attach procedure the UE 205 would return to camp in the 5GC 210 system. In yet another embodiment, if the UE 205 determines to transfer all PDU Sessions from the first system (here, the 5GC 210) to the second system (here, the EPC 215). In this embodiment, the UE 205 decides to not suspend services in the first system as there may be no services remaining there, and thus determines to not include an indication for suspension of services.

In some embodiments, the UE 205 may elect to transfer one or more PDU Sessions in the 5GC 210 to the EPC 215. In such embodiments, the 'suspend 5G services' indication does not apply for the 5G services (PDU Sessions) transferred from 5GC to EPC, i.e. the PDU Sessions for which the UE performed PDN Connection establishment with the MME. In one embodiment, the UE 205 performs PDN connection establishment procedure together with the Attach procedure. In another embodiment, the UE performs PDN connection establishment (PDU Session transfer) as stand-alone procedure, e.g. by sending a PDN Connection Request message with "handover" indication (not shown).

However, the UE 205 may also perform a new PDN Connection establishment without including the "handover" indication. Here, the APN for such PDN Connection may be the same as the APN/DNN on an existing PDU Session in the 5GC 210 (for which the HSS+UDM 225 stores the SMF+PGW-C address). Here, the MME 235 may decide to assign a new PGW (e.g., a new SMF+PGW-C) for the new PDN Connection. In this case, the MME 235 updates the HSS+UDM 225 about the new SMF+PGW-C assigned to the same APN/DNN.

In response to the Attach Procedure (or TAU procedure) the MME 235 initiates UE subscription retrieval towards the HSS+UDM 225 in order to download the subscription data for the UE 205 (see signaling 530). In the subscription retrieval request, the MME 235 indicates that this is not an initial attach, meaning that the UE 205's registration at the AMF 230 shall not be cancelled. Additionally, the MME 235 may indicate that 5GS services (e.g. PDU Sessions) can be suspended. As discussed above, when suspended the existing PDU Sessions established in 5GC cannot be used for data transmission. However, suspending 5GC services, the PDU Session context should be kept in the AMF 230 and SMF/UPF (e.g., the UPF+PGW-U 155 and SMF+PGW-C 160). As mentioned above, one example of such in indication is the 'suspend 5G services' parameter; however, other indication expressing same/similar meanings may be used in other embodiments.

Recall that the UE 205 may request to transfer some PDU Sessions from the 5GC 210 to PDN Connections in the EPC 215. The indication 'suspend 5G services' applies to services (e.g., existing PDU Sessions in 5GC 210) which are NOT transferred from the first system (5GC 210) to the second system (EPC 215). In response to the request to transfer some PDU Sessions, the MME 235 requests APN-related subscription information from HSS+UDM 2025, for which the UE 205 requested PDN Connection establishment. During retrieval of the APN-related subscription information, the MME 235 indicates a list of one or more APNs for which the UE 205 performs PDN Connection establishment procedure (not shown).

In some embodiments, the UE 205 indicates a "handover" during the PDN Connection establishment procedure with the MME 235, triggering retrieval of APN-related subscription information from the HSS+UDM 225. In addition, the MME 235 may include, in the subscription retrieval request, a 'handover' indication for the APN for which the UE 205 indicated 'handover' in the PDN Connection establishment request message. Moreover, if the UE 205 does not indicate 'handover' during the PDN Connection establishment procedure with the MME 235, then the MME 235 does not include 'handover' during the APN-related subscription information retrieval from HSS+UDM 225.

The HSS+UDM 225 may keep a track in the stored APN-related subscription information for which one or more SMF+PGW-Cs 160 have been registered by the EPC 215 (e.g., the MME 235) and which SMF+PGW-Cs 160 have been registered by the 5GC 210 (e.g., the SMF itself). When the MME 235 requests APN-related subscription information and the HSS+UDM 225 provides the SMF+PGW-C 160 address, the MME 235 indicates back to the HSS+UDM 225 whether this SMF+PGW-C 160 is used in the EPC 215.

Accordingly, the HSS+UDM 225 maintains up-to-date information of which SMF+PGW-C 160 is used in which system (or core network). This is at least useful in case where the UE 205 has some PDN Connections in the EPC 215 and other PDU Sessions in the 5GC 210 (independent whether the UE 205 is single Tx/Rx or dual Tx/Rx capable). In certain embodiments, one SMF+PGW-C 160 may be used in the EPC 215 and another SMF+PGW-C 160 may be used in the 5GC 210 for the same APN/DNN.

When transferring the PDU Sessions, the MME 235 resolves the PGW address (e.g. of the common SMF+PGW-C entity 160) based on the subscription information received from the HSS+UDM 225. The PDN Connection Request message contains an APN, which is mapped in the MME 235 to the APN-related subscription information received from the HSS+UDM 225, which in turn contains the co-located SMF+PGW-C 160 address.

In response to the MME 235 passing along the indication to suspend services in the 5GC 210, the HSS+UDM 225 updates the AMF 230 about the UE's registration at the EPC 215. In addition, the HSS+UDM 225 indicates that the services in 5GS (e.g. existing PDU Sessions) are suspended, i.e. the existing 5GS PDU Sessions cannot be used for data transmission. Note, however, that the PDU Session context is kept in the AMF 230 and SMF/UPF. Recall that the indication to suspend 5G services applies to existing PDU Sessions in the 5GC 210, but not to any PDU Sessions transferred to the EPC 215. In some embodiments, the HSS+UDM 225 sends a subscriber data update notification to the AMF 230, for example using the "Nudm_SubscriberDataManagement_UpdateNotification" service.

Based on the 'suspend 5G services' indication from the HSS+UDM 225, the AMF 230 updates the mobility management to ("MM") state of the UE 205 'UE unreachable' in 5GS (see block 540). In some embodiments, the 'UE unreachable' state is a sub-state of the CM-IDLE state, such that the corresponding CM-IDLE timers continue to run. For example, if any SMF requests establishment of UP resources (e.g. Downlink data notification or Paging for DL data), the AMF responds with UE unreachable.

In certain embodiments, the subscriber data update notification includes a list of one or more DNNs/APNs for which the MME 235 has requested APN-related subscription information. For example, the HSS+UDM 225 may include the indication 'EPC requested APNs' in the subscriber data update notification. The list of DNNs/APNs indicates to the AMF 230 that the PDU Sessions corresponding to the DNN have been transferred to PDN Connections in the EPC 215.

Upon receiving the EPC requested APNs, the AMF 230 may internally delete the association with the SMF (e.g., SMF+PGW-C 160) for the corresponding PDU Sessions (see block 540). As used herein, internally deleting the SMF association refers to the AMF 230 performing release of N11 association to the SMF+PGW-C 160. For example, the AMF 230 may invoke the "Nsmf_PDUSession_UpdateSMContext" service with an indication that the N11 association is to be released. Moreover, the AMF 230 may indicate that the PDU Session is not released as a corresponding PDN Connection is used in the EPC 215. If the AMF 230 has context for multiple PDU Sessions established towards the same DNN/APN, then the AMF 230 initiates N11 signaling to the corresponding SMF+PGW-C 160 for all PDU Sessions associated with the particular DNN/APN.

While the UE 205 is in the 'UE unreachable' state, the AMF 230 will reject any request to establish UP resources, thereby preventing signaling (e.g., paging) the UE 205 from the 5GC 210. There are several possible alternatives how the AMF can inform the SMFs (e.g., SMF+PGW-Cs 160) about the UE unreachability state. In a first alternative (depicted as "Option (A)") the AMF 230 proactively informs the corresponding SMFs (e.g., SMF+PGW-Cs 160) about the UE unreachability status (see signaling 545). In a second alternative (depicted as "Option (B)") the AMF 230 informs the corresponding SMFs (e.g., SMF+PGW-Cs 160) about the UE unreachability status once the SMFs (e.g., SMF+PGW-Cs 160) have requested the establishment of UP resources, e.g. when DL data has arrived for the PDU Session.

In some embodiments, the AMF 230 may inform in advance the corresponding SMFs (e.g., SMF+PGW-Cs 160) about unreachability of the UE 205 in response to the MM state of the UE 205 in the AMF 230 being updated to 'unreachable' (see signaling 545). The 'unreachable' UE SM context means that the SMF+PGW-C 160 does not initiate any signaling for establishing the UP resources for DL data or MT signaling until the AMF 230 again updates the UE SM context upon the UE 205 becoming reachable. In certain embodiments, the AMF 230 may invoke the "Nsmf_PDUSession_UpdateSMContext" service to update the UE SM context due to the unreachability of the UE for the time being. When the UE 205 is again reachable, the AMF 230 may again invoke the "Nsmf_PDUSession_UpdateSMContext" service to update the SMF+PGW-C 160.

In other embodiments, the AMF 230 does not proactively inform the SMF+PGW-Cs 160 about unreachability of the UE 205. Instead, while the UE's 5GC services are suspended, if DL arrives at the UPF (see optional signaling 550), the network (e.g., UPF+PGW-U would start the network-initiated Service Request procedure towards a SMF+PGW-C 160 to establish the UP resources. The SMF+PGW-C 160 invokes an AMF 230 service via the N11 interface to requests the establishment of UP resources. For example, the SMF+PGW-C 160 may invoke the "Namf_Communication_N1N2MessageTransfer" service operation to the AMF 230 with contents "N2 SM information (PDU Session ID, QoS Profile, Session-AMBR)" to transfer an N2 SM message towards the RAN.

However, because the UE MM state in the AMF 230 is 'unreachable', the AMF 230 replies negatively which a corresponding cause why the UP resources cannot be established (see optional signaling 555). Here, the cause may be 'UE unreachable'. Thereafter, the SMF+PGW-C 160 updates its UE SM context to 'unreachable' and not initiate any signaling for establishing the UP resources for DL data or MT signaling until the AMF 230 again updates the UE SM context upon the UE 205 becoming reachable.

Continuing at FIG. 5B, the UE 205 establishes service in the EPC 215, e.g., establishing one or more PDN Connections (see block 560). Based on the UE's implementation (or on UE/network policies), the UE 205 may transfer particular PDU Sessions from the 5GC 210 to the EPC 215. As discussed above, the UE 205 may transfer PDU Sessions by indicating 'handover' to the MME 235 during the PDN Connectivity establishment.

If a PDU Session has been transferred from 5GC to EPC, the MME 235 initiates the establishment of an S5 bearer between the SGW 150 and the SMF+PGW-C 160. With this, the UE 205's context in the SMF+PGW-C 160 is updated from N11 association with the AMF 230 to S5 bearer association with the SGW 150. In such embodiments, the SMF+PGW-C 160 also initiates a procedure to delete/release the N11 association with the AMF 230 (see signaling 565).

In some embodiments, the SMF+PGW-C uses a new cause value to indicate to the AMF 230 that the release of the N11 association is due to the transfer of the PDU Session from the 5GC 210 to the EPC 215. Such an indication would inform the AMF 230 that there are no N1 SM messages to be transferred between the UE 205 and the SMF+PGW-C 160, so that the release of the N11 association is performed without any delay. Moreover, the AMF 230 updates the UE's context stored in the AMF 230 as if this PDU Session would be released on the 5GC 210 and the AMF 230 releases this PDU Session ID and the corresponding N11 association. One example of such a new cause value can be 'inter-system PDU Session transferred' or 'PDU Session unavailable' or 'implicit PDU Session release' (meaning without N1 SM message), but other names expressing same/similar meanings may be used.

At some later point in time, the UE 205 determines to discontinue EPC service (see block 570). In one embodiment, such as determination is due to termination of the EPC services (e.g. terminating Emergency Services). As an example, a call or a corresponding PDN connection belonging to the service for which the UE 205 attaches to the EPC 215 may terminate. In another embodiment, the UE 205 determines to transfer sessions a handover back to the 5GS (e.g., discontinue EPC service due to handover).

When discontinuing EPC service, the UE 205 may transfer to an EMM-IDLE state (e.g., with no PDN Connections established). Alternatively, the UE 205 may perform a Detach procedure with the MME 235. When service in the EPC 215 is not terminated, the UE 205 and the MME 235 may retain PDN Connection context information. Accordingly, the UE 205 may suspend EPC service, rather than detach from the EPC 215.

At this point, the UE 205 is in MM Registered state and CM-IDLE state in the 5GC 210. To resume services in the 5GC 210, the UE 205 sends a NAS mobility management message towards the AMF 230 to re-activate its registration and/or services with the 5GC 210 (see signaling 575). Note that the UE 205 may configure its radio to use the NR RAT 510 to communicate with the AMF 230.

In some embodiments, the UE 205 re-activates its registration and/or services with the 5GC 210 by sending a Registration Request message to the AMF 230. Here, the Registration Request may include an indication that the registration is for 'mobility'. Additionally, the UE 205 may use an informational element 'PDU Session status' to indicate to the AMF 230 which PDU Sessions are still established in the UE 205, e.g., for which PDU Sessions the UE 205 maintains valid PDU Session context.

The AMF 230 uses the 'PDU Session status' indication for several purposes, e.g. a) to align the PDU Sessions context and N11 associations stored in the AMF 230 with the PDU Sessions established (e.g., that remain valid) in the UE and b) to resume the PDU Sessions which are indicated in the PDU Session status informational element if those PDU Sessions have been suspended before. For example, one consequence of b) is that the AMF 230 initiates the signaling in step 10 (see signaling 590). As such, the element 'PDU Session status' can be used as implicit indication for resuming the services (e.g., PDU Sessions) in the 5GC 210. Note that the UE 205 does not include PDU Sessions which have been transferred to EPC 215 in the PDU Session status informational element. This is because the PDU Session which were transferred to PDN Connections in the EPC are implicitly deleted in the UE's 5GC NAS protocol stack and transferred to the UE's EPC NAS protocol stack.

In certain embodiments, the UE 205 re-activates its registration and/or services with the 5GC 210 by sending a Service Request message to the AMF 230. Here, the Service Request may include the list of existing services (e.g. existing PDU Session IDs) to be resumed. For example, such a list of PDU Session IDs can be the informational element 'PDU Session status'. The handling of the element 'PDU Session status' in the AMF can be similar as described above for the Registration Request message. Note that if the UE 205 has established PDN Connection in the EPC 215 (e.g., PDN Connections not released or to be transferred to the 5GC 210), then the UE 205 may indicate to the AMF 230 that the EPC service needs to be suspended. One example of such an indication is the element 'suspend EPS services' or "suspend 4G services', but other names expressing same/similar meanings may be used in other embodiments.

As depicted in FIG. 5B, the UE 205 may include an explicit indication in the NAS mobility management message towards the AMF 230 that the PDU Sessions included e.g. in the 'PDU Session status' element are to be resumed.

This indication is used by the AMF 230 to initiate the signaling of step 10 (see signaling 590). One example of such an indication is the element 'resume 5G services' or "resume services' or 'resume PDU Sessions', but other names expressing same/similar meanings may be used in other embodiments.

Similar to when the UE 205 established PDN Connections in the EPC 215, when resuming 5G services the UE 205 may initiate PDU Sessions establishment procedure. Here, the UE 205 may include a 'handover' indication to indicate that the PDU Session is a transfer from a PDN Connection in the EPC 215. The AMF 230 retrieves subscription information from the HSS+UDM 225 and uses the downloaded subscription information to identify which SMF+PGW-C 160 needs to be used for the PDU Session establishment with 'handover' indication. However, if the UE 205 does not indicate 'handover' during the PDU Session establishment procedure with the AMF 230, then the AMF 230 does not include 'handover' during the APN-related subscription information retrieval from HSS+UDM 225.

In response to the NAS MM message for resuming 5G service, the AMF 230 performs a location/registration update procedure with the HSS+UDM 225 (see signaling 580). Here, the AMF 230 indicates this is not an initial registration so as not to cancel the UE 205's registration in the EPC. In addition, the AMF 230 may indicate which APNs/DNNs have been requested for transfer from the EPC 215 to the 5GC 210. Further, if the UE 205 has included 'suspend EPS services' indication in the NAS MM message, then the AMF 230 may indicate that services in the EPC 215 are to be suspended.

The HSS+UDM 225, in turn, performs a procedure to update the UE registration with the MME 235 (see signaling 585). Further, the HSS+UDM 225 may indicate to the MME 235 that 4G services are suspended (if indicated by the AMF 230). Where the UE 205 request transfer of one or more PDN Connections in the EPC 215 to PDU Session sin the 5GC 210, then the HSS+UDM 225 may also indicate a list of APNs/DNNs for which the PDN Connections has been transferred from the EPC 215 to the 5GC 210. As an example, this indication may be called '5GC requested APNs'; however, other names expressing same/similar meanings may be used in other embodiments. Optionally, if the MME 235 receives an indication '5GC requested APNs', then the MME 235 may trigger a release of PDN Connections corresponding to the list of APNs without EPC NAS signaling to the UE 205.

Finally, the AMF 230 triggers an update procedure of the SM context towards the relevant SMF+PGW-Cs 160 (see signaling 590). For example, the AMF 230 may use the service "Nsmf_PDUSession_UpdateSMContext (PDU Session ID, 'UE reachable')" to update the UE SM context. The cause value 'UE reachable' indicates that the SMF+PGW-C 160 can send a DDN/Paging request to AMF 230 if there is DL data.

While described as updating UE SM context in an SMF+PGW-C 160, the procedure of the AMF 230 updating the UE's context in SMF as described with reference to signaling 545, 555, and 590 can be also applied to update the UE's context in other 5GC nodes, e.g., for delivery of control plane requests to the UE 205. For example, the AMF 203 can update the UE 205's context in the SMSF with the indication that the UE is unreachable in the 5GC. In such a scenario, the SMSF (or other SMS-relevant entities) would perform the MT SMS delivery over the other system (e.g., over the EPC 215). This approach has the advantage to save signaling (e.g. paging the UE 205) in the system, where the services (e.g. PDU Sessions) are suspended.

While described as the UE 205 switching from the 5GC to the EPC, analogous procedures for 'suspend 4G services' can be applied in case that the UE 205 has been originally attached to the EPC 215 and initiates a DR-mode operation with the 5GC 210. In such case the UE 205 sends the 'suspend 4G services' indication to the AMF 230 during mobility Registration Request procedure to the 5GC 210. This operation is similar to that described in signaling steps 575, 580, and 585. Upon discontinuing services in the 5GC 210, the UE 205 re-attaches to the EPC 215, similar to signaling steps 525, 530, and 535. Throughout the analogous procedures, the HSS+UDM 225 synchronizes UE states in the 5GC 210 and EPC 215 to avoid paging the UE 205 in one system when it is using services in the other system.

In an analogous embodiment, a core network internal suspension of services can be performed based on the following procedure. The AMF 230 can use the cause to release an N11 association as per signaling 565 as an indication that the UE 205 is using services at another core network (e.g. in the EPC 210). If the AMF 230 in addition knows the UE 205 radio capability, which is not able to receive or transmit simultaneously data or signaling in both systems, then the AMF 230 may determine to suspend the services in the 5GC 210. In such an embodiment, there is no need for the UE 205 to request suspension of service in its message to the second core network (e.g., to the MME 235 in the EPC 215, refer to signaling 515). However, the UE 205 needs to inform the first core network (e.g., the AMF 230 in the 5GC 210) about UE's radio capability and the core network maintains this UE's information in the UE's context stored in the AMF 230 (or MME 235).

Figure 6A:
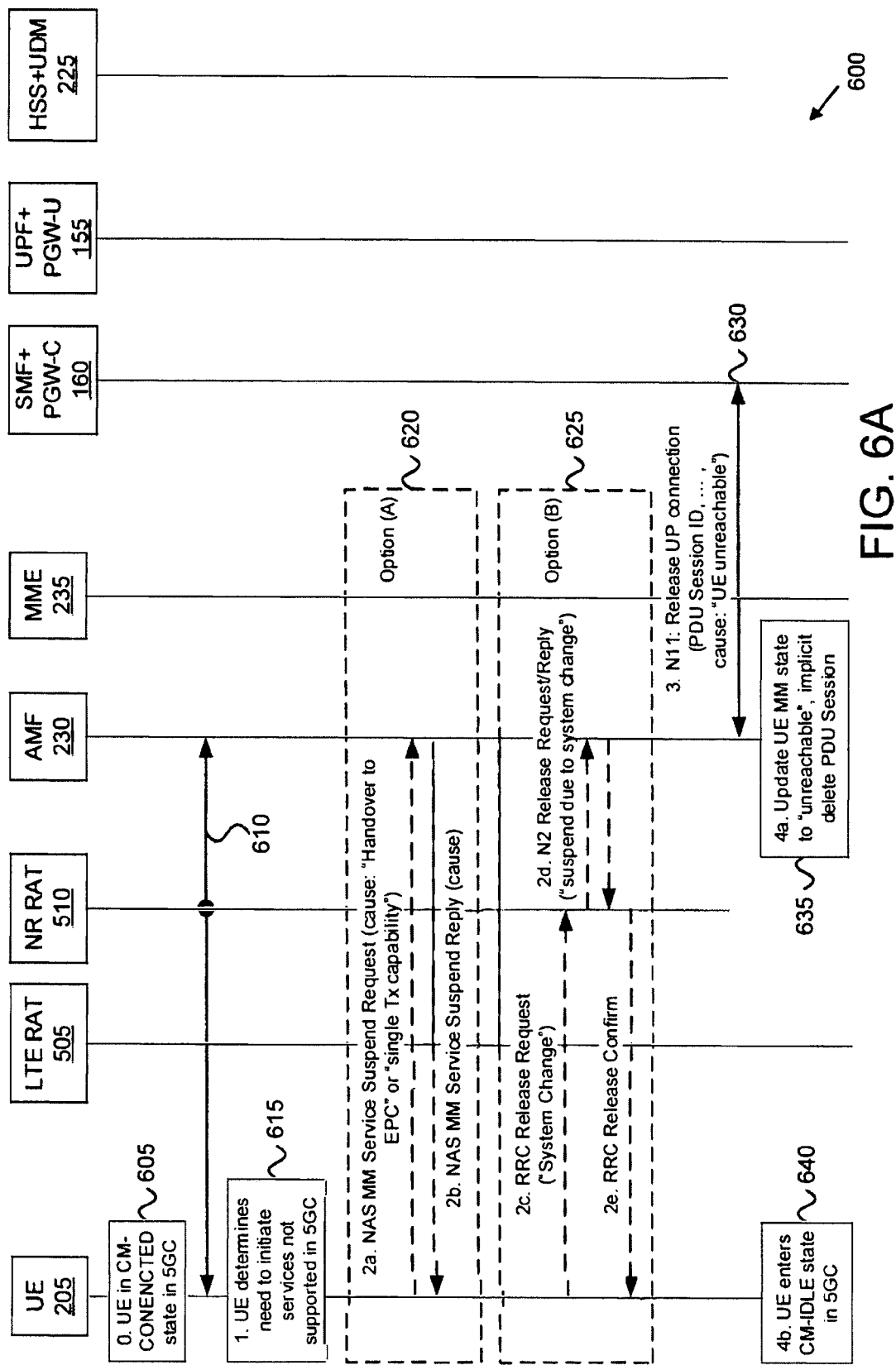
FIG. 6A is a block diagram illustrating another embodiment of a network procedure for suspending services in a first core network for a dual-registered UE.
Figure 6B:
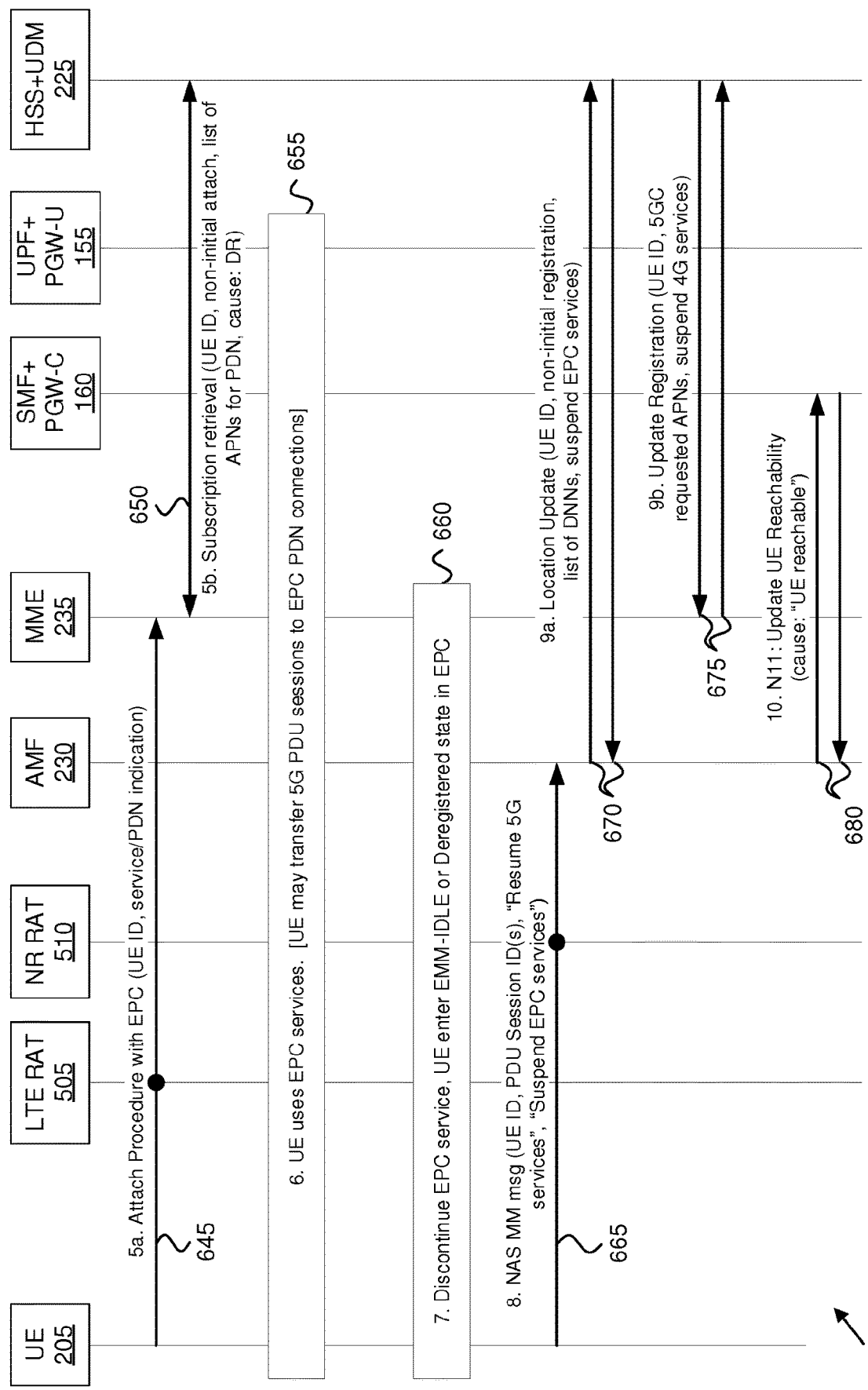
FIG. 6B is a continuation of the network procedure of FIG. 6A.

FIGS. 6A and 6B depict a network procedure 600 for suspending services in a first core network for a dual-registered UE, according to embodiments of the disclosure. The network procedure 600 involves the UE 205, the AMF 230, the MME 235, the SMF+PGW-C 160, the UPF+PGW-U 155, and the HSS+UDM 225. Also involved are the LTE RAT 505 (e.g., the EUTRAN) and the NR (5G) RAT 510. As discussed above, the AMF 230 is a component of the 5GC 210 (not depicted) and the MME 235 is a component of the EPC 215 (not depicted).

At FIG. 6A, the network procedure 600 begins as the UE 205 is registered with a first system, here with the 5GC 210 via a NR RAT 210. In the network procedure 600, the (5GC) NAS layer state for the UE 205 is the CM-CONNECTED state (see block 605), meaning that the UE 205 has an active RRC connection with the NR RAT 510 and an active NAS connection with the AMF 230 in the 5GC 210. Similarly, the AMF 230 also stores the UE 205 state in the 5GC 210 as CM-CONNECTED. Over the active connections, the UE 205 uses services in the 5GC 210 (see signaling 610).

At a first point in time, the UE 205 determines that registration with a second system (e.g. with EPC 215 via the LTE RAT 505) is needed, e.g., to set up services that are not supported in the first system (see block 615). As the UE 205 is DR-mode capable, the UE 205 is able to perform attach with the EPC 215 without deregistering with the 5GC 210 (e.g., in order to setup services which are not supported in the 5GC 210). However, here the UE 205 is not Dual Rx/Tx capable.

Because the UE 205 has an active connection to the 5GC 210, it cannot immediately initiate signaling (e.g. attach) to the EPC 215. Rather, the UE 205 gracefully terminates the N1 connection (at corresponding N2 signaling association) before attaching to the EPC 215. In one embodiment, the UE 205 sends a NAS MM message to the AMF 230 requesting suspension of 5GS services, e.g., due to fallback to the EPC system 215 (see signaling 620). In another embodiment, the UE 205 sends a RRC release request message to the NR RAT 510 node (e.g., a gNB) with a new indication that system change, e.g., system fallback to the EPC system 215 (see signaling 625).

When sending the NAS MM message to the AMF 230 (labeled "Option (A)"), the UE 205 can select from various message types. In a first embodiment, the UE 205 sends a new NAS MM message referred to as a "Service Suspend Request" message for clearly requesting suspension of 5GS services, e.g., due to fallback to the EPC system 215. In another embodiment, the UE 205 sends a new corresponding indication (e.g. 'suspend service') within an existing 5GC NAS message, such as the Service Request message or other suitable NAS MM message. In various embodiments, the UE 205 may indicate to the AMF a cause for the service suspension, e.g. due to inability to receive services simultaneously in both systems. One example of such a cause can be called e.g. 'handover to EPC' or 'fallback to EPC', or 'emergency fallback to EPC', but other names expressing same/similar meanings may be used in other embodiments.

When sending the RRC release request message to the NR RAT 510 node (gNB), the UE 205 includes a (new) indication that system change is needed (e.g. system fallback to EPC system). Here, the gNB is aware of the radio capabilities of the UE 205 (e.g., single Rx or single Tx capability). Accordingly, the gNB can determine that the UE is unable to receive 5GS services while registered with the EPC. Hence, the gNB may decide to initiate the UE context release in the (R)AN. Moreover, the gNB sends an explicit indication to the AMF during the N2 context release procedure that the suspension is due to system change. For example, the gNB may indicate 'suspend due to system change' to the AMF.

Regardless of the mechanism for informing the AMF 230 of the service suspension request, the AMF 230 triggers release of UP resources/connections towards the relevant SMF+PGW-Cs 160 (see signaling 630). For example, the AMF 230 may update the UE SM context in a SMF+PGW-C 160 using the service "Nsmf_PDUSession_UpdateSMContext" with contents (PDU Session ID, PDU Session Deactivation, Cause 'suspend PDU Session')". Note that the cause 'suspend PDU Session' indicates that the SMF+PGW-C 160 is not to send a DDN/Paging request to the AMF 230 if there is DL data.

The AMF 230 receives the request to suspend services in the 5GC 210 and sets the MM state for the UE 205 as 'unreachable in 5GS' (see block 635). While the UE 205 is in the 'unreachable' state, the AMF 230 does not perform MT signaling towards the UE 205, such as a Paging procedure. Moreover, if any SMF+PGW-C 160 requests establishment of UP resources (e.g. Downlink data notification or Paging for DL data), the AMF 230 responds with UE unreachable.

During the service suspension, the UE 205 keeps existing PDU Session contexts, but marks the 5GC NAS SM state as temporarily not available (or not used) service. For example, the UE internally rejects requests from the Application layer to send UL data on existing or new 5GS service. As discussed above, the UE may elect to transfer one or more PDU Sessions from the 5GC 210 to PDN Connections in the EPC 215. In such a scenario, the corresponding EPC NAS SM contexts are created based on the existing 5GC NAS SM contexts. In one embodiment, the UE 205 keeps the 5GC NAS SM contexts belonging to transferred PDU Sessions, but marks them as unavailable (or not used). In another embodiment, the 5GC NAS SM contexts may be internally deleted in the UE 205 without explicit N1/NAS SM signaling with the corresponding SMF+PGW-C 160.

In response to terminating the N2 connection, the UE 205 transfers to the CM-IDLE state in 5GS (see block 640). Correspondingly, the UE's state in the AMF 230 is CM-IDLE and 'UE unreachable'.

Continuing at FIG. 6B, the UE 205 configures its radio to use the LTE RAT 505 and initiates an Attach procedure with the MME 235 in the EPC 215 (see signaling 645). Alternatively, the UE 205 may instead initiate a Tracking Area Update ("TAU") procedure, for example where the UE 205 is connected to the 5GC 210 via an E-UTRAN (e.g., using the LTE RAT 505). When attaching to the EPC 215, the UE 205 does not indicate an 'initial' attach (or similar indication) in order to let the MME 235 know that the UE 205 is coming from the 5GC 210 and that the registration at the 5GC 210 is not to be cancelled (thus, the UE 205 is operating in DR-mode).

In certain embodiments, the UE 205 may elect to transfer one or more PDU Sessions in the 5GC 210 to the EPC 215. In some embodiments, the UE 205 performs PDN connection establishment procedure together with the Attach procedure. In other embodiments, the UE 205 performs PDN connection establishment procedure as stand-alone procedure, e.g. by sending a PDN Connection Request message with "handover" indication (not shown).

In response to the Attach Procedure (or TAU procedure) the MME 235 initiates UE subscription retrieval towards the HSS+UDM 225 in order to download the subscription data for the UE 205 (see signaling 650). In the subscription retrieval request, the MME 235 indicates that this is not an initial attach, meaning that the UE 205's registration at the AMF 230 shall not be cancelled.

In response to a request to transfer some PDU Sessions, the MME 235 requests APN-related subscription information from HSS+UDM 225. In some embodiments, the UE 205 indicates a "handover" during the PDN Connection establishment procedure with the MME 235, triggering retrieval of APN-related subscription information from the HSS+UDM 225. In addition, the MME 235 may include, in the subscription retrieval request, a 'handover' indication for the APN for which the UE 205 indicated 'handover' in the PDN Connection establishment request message. Moreover, if the UE 205 does not indicate 'handover' during the PDN Connection establishment procedure with the MME 235, then the MME 235 does not include 'handover' during the APN-related subscription information retrieval from HSS+UDM 225. During retrieval of the APN-related subscription information, the MME 235 indicates a list of one or more APNs for which the UE 205 performs PDN Connection establishment procedure (not shown).

Next, the UE 205 establishes service in the EPC 215, e.g., establishing one or more PDN Connections (see block 655). Based on the UE's implementation (or on UE/network policies), the UE 205 may transfer particular PDU Sessions from the 5GC 210 to the EPC 215. As discussed above, the UE 205 may transfer PDU Sessions by indicating 'handover' to the MME 235 during the PDN Connectivity establishment. Note that the MME 235 (or other entity in the EPC 215) may determine not to transfer PDU Sessions from the 5GC 210 to PDN Connections in the EPC 215 if the reason for the UE 205 Attach to the EPC 215 is to use Emergency Services. Although it is not depicted, please note that the SMF+PGW-C 160 can also perform the release of N11 association with the AMF 230, such as shown in signaling 565 of FIG. 5B.

At some later point in time, the UE 205 in DR-mode of operation determines to discontinue EPC service (see block 660). In one embodiment, such as determination is due to termination of the EPC services (e.g. terminating Emergency Services). As an example, a call or a corresponding PDN connection belonging to the service for which the UE 205 attaches to the EPC 215 may terminate. In another embodiment, the UE 205 determines to transfer sessions a handover back to the 5GS (e.g., discontinue EPC service due to handover).

Note that in the case where the UE 205 initiates an Emergency Attach in the EPC 215 (e.g., to use Emergency Services not supported in the 5GC 210) and after the emergency service is terminated (e.g., Emergency PDN Connection expiry timer set, for instance, 10 min after UE 205 is in IDLE), the MME 235 may initiate Detach request to the UE 205 and optionally with indication for 5GC mobility registration.

When discontinuing EPC service, the UE 205 may transfer to an EMM-IDLE state (e.g., with no PDN Connections established). Alternatively, the UE 205 may perform a Detach procedure with the MME 235. When service in the EPC 215 is not terminated, the UE 205 and the MME 235 may retain PDN Connection context information. Accordingly, the UE 205 may suspend EPC service, rather than detach from the EPC 215.

At this point, the UE 205 is in MM Registered state and CM-IDLE state in the 5GC 210. To resume services in the 5GC 210, the UE 205 sends a NAS mobility management message towards the AMF 230 to re-activate its registration and/or services with the 5GC 210 (see signaling 665). Note that the UE 205 may configure its radio to use the NR RAT 510 to communicate with the AMF 230.

In some embodiments, the UE 205 re-activates its registration and/or services with the 5GC 210 by sending a Registration Request message to the AMF 230. Here, the Registration Request may include an indication that the registration is for 'mobility'. Additionally, the UE 205 may use an informational element 'PDU Session status' to indicate to the AMF 230 which PDU Sessions are still established in the UE 205, e.g., for which PDU Sessions the UE 205 maintains valid PDU Session context.

The AMF 230 uses this indication to resume the PDU Sessions which are indicated in the PDU Session status informational element. Note that the UE 205 does not include PDU Sessions which have been transferred to EPC 215 in the PDU Session status informational element. This is because the PDU Session which were transferred to PDN Connections in the EPC are implicitly deleted in the UE's 5GC NAS protocol stack.

In certain embodiments, the UE 205 re-activates its registration and/or services with the 5GC 210 by sending a Service Request message to the AMF 230. Here, the Service Request may include the list of existing services (e.g. existing PDU Session IDs) to be resumed. Note that if the UE 205 has established PDN Connection in the EPC 215 (e.g., PDN Connections not released or to be transferred to the 5GC 210), then the UE 205 may indicate to the AMF 230 that the EPC service needs to be suspended. One example of such an indication is the element 'suspend EPS services' or "suspend 4G services', but other names expressing same/similar meanings may be used in other embodiments.

Similar to when the UE 205 established PDN Connections in the EPC 215, when resuming 5G services the UE 205 may initiate PDU Sessions establishment procedure. Here, the UE 205 may include a 'handover' indication to indicate that the PDU Session is a transfer from a PDN Connection in the EPC 215. The AMF 230 retrieves subscription information from the HSS+UDM 225 and uses the downloaded subscription information to identify which SMF+PGW-C 160 needs to be used for the PDU Session establishment with 'handover' indication. However, if the UE 205 does not indicate 'handover' during the PDU Session establishment procedure with the AMF 230, then the AMF 230 does not include 'handover' during the APN-related subscription information retrieval from HSS+UDM 225.

In response to the NAS MM message for resuming 5G service, the AMF 230 performs a location/registration update procedure with the HSS+UDM 225 (see signaling 670). Here, the AMF 230 indicates this is not an initial registration so as not to cancel the UE 205's registration in the EPC. In addition, the AMF 230 may indicate which APNs/DNNs have been requested for transfer from the EPC 215 to the 5GC 210. Further, if the UE 205 has included 'suspend EPS services' indication in the NAS MM message, then the AMF 230 may indicate that services in the EPC 215 are to be suspended.

The HSS+UDM 225, in turn, performs a procedure to update the UE registration with the MME 235 (see signaling 675). Further, the HSS+UDM 225 may indicate to the MME 235 that 4G services are suspended (if indicated by the AMF 230). Where the UE 205 request transfer of one or more PDN Connections in the EPC 215 to PDU Session sin the 5GC 210, then the HSS+UDM 225 may also indicate a list of APNs/DNNs for which the PDN Connections has been transferred from the EPC 215 to the 5GC 210. As an example, this indication may be called '5GC requested APNs'; however, other names expressing same/similar meanings may be used in other embodiments. Optionally, if the MME 235 receives an indication '5GC requested APNs', then the MME 235 may trigger a release of PDN Connections corresponding to the list of APNs without EPC NAS signaling to the UE 205.

Finally, the AMF 230 triggers an update procedure of the SM context towards the relevant SMF+PGW-Cs 160 (see signaling 680). For example, the AMF 230 may use the service "Nsmf_PDUSession_UpdateSMContext (PDU Session ID, 'UE reachable')" to update the UE SM context. The cause value 'UE reachable' indicates that the SMF+PGW-C 160 can send a DDN/Paging request to AMF 230 if there is DL data.

While described as the UE 205 switching from the 5GC to the EPC, analogous procedures for Service Suspend request in EPC can be applied in case that the UE 205 has been originally attached to the EPC 215 and initiates a DR-mode operation with the 5GC 210. In such case the UE 205 sends Service Suspend request to the MME 235 before initiating the mobility Registration Request procedure with the 5GC 210. This operation is similar to that described in signaling steps 620 and 625.

While described as updating UE SM context in an SMF+PGW-C 160, the procedure of the AMF 230 updating the UE's context in SMF as described with reference to signaling 630 can be also applied to update the UE's context in other 5GC nodes. For example, the AMF 203 can update the UE 205's context in the SMSF with the indication that the UE is unreachable in the 5GC. In such a scenario, the SMSF (or other SMS-relevant entities) would perform the MT SMS delivery over the other system (e.g., over the EPC 215).

FIGS. 5A-B and 6A-B depict the UE 205 changing RAT during service fallback. Here, the assumption is that for the service fallback, the UE 205 transfers from NR/5GC to E-UTRAN/EPC. However, it is also possible for the UE 205 to be connected to the 5GC 210 via the LTE RAT 505, e.g., a E-UTRAN/5GC combination, and the fallback is an inter-system fallback from E-UTRAN/5GC to E-UTRAN/EPC. This second scenario may be needed if the services supported in core networks are different. This would mean an intra-cell but inter-system transfer if the UE 205 was in CONNECTED state, and inter-system change if the UE 205 was in IDLE state (as the UE 205 needs to perform TAU procedure towards EPC 215 camping under the same cell).

Although not depicted in the network procedures 500 or 600, in certain embodiments, the HSS+UDM 225 is aware about the UE 205 capability in the access stratum (e.g. single Rx/Tx). As a first example, during initial Attach (e.g., with the EPC 215) or initial Registration (e.g., with the 5GC 210) procedures, the MME 235 (or AMF 230) learns the UE's capabilities, including radio capabilities (e.g. single/dual Tx/Rx), via a NAS signaling exchange. The MME 235 (or AMF 230) may then forward these UE capabilities to the HSS+UDM 225. Alternatively, the HSS+UDM 225 may be provisioned with UE's radio capabilities via any other means, e.g. via OMA-DM system or other systems. When the UE 205 performs DR-mode NAS MM procedures with, e.g., PDN Connection activation in EPC, then the HSS+UDM 225 determines that mobile terminated 5GC services should be suspended and the HSS+UDM 225 indicates to AMF 230 that the UE 205 is in the EPC system 215 and MT services in the 5GC 210 are to be suspended. However, this approach would require that the HSS+UDM 225 be aware about the radio capabilities of the UE 205 and it may not be desirable to store UE radio capabilities in the HSS+UDM.

Figure 7:
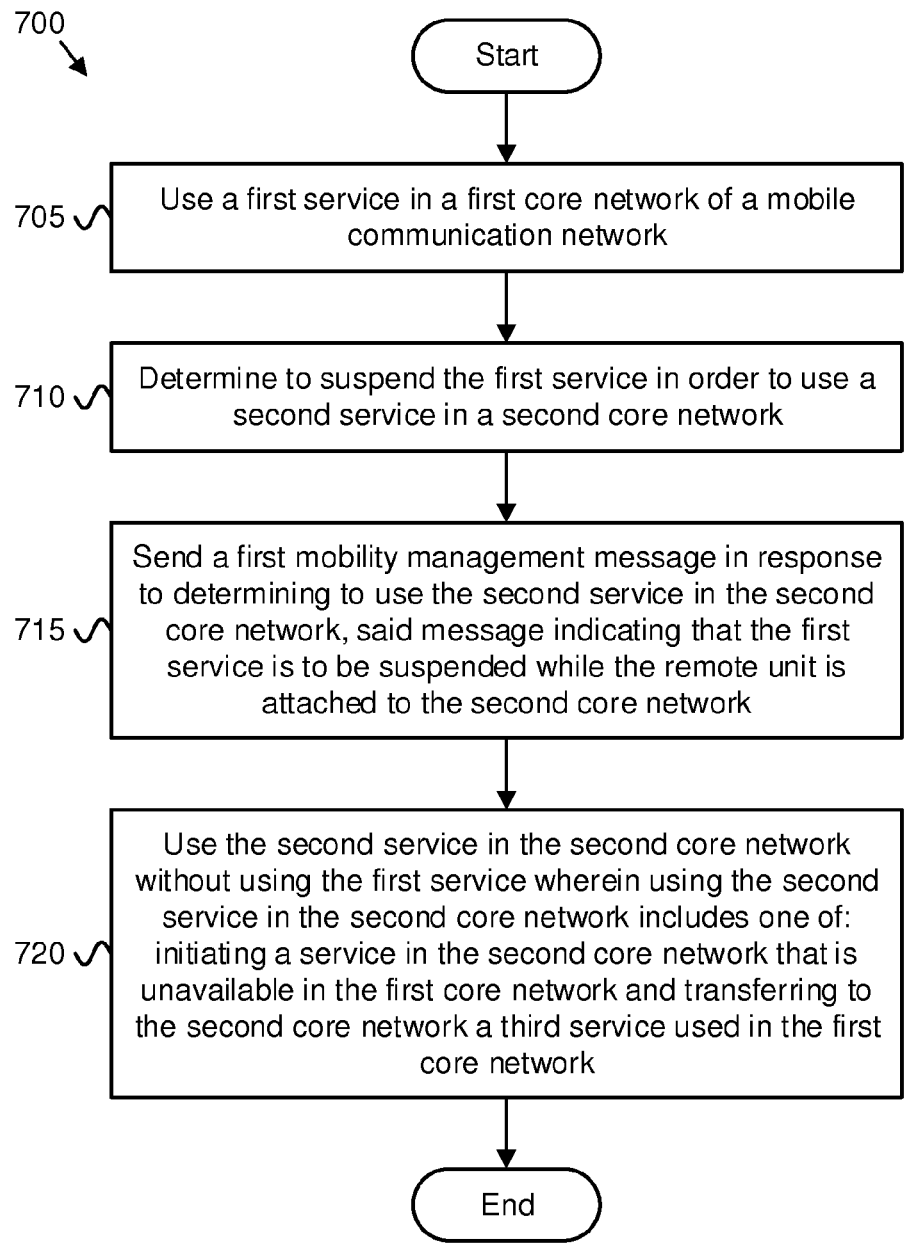
FIG. 7 is a flow chart diagram illustrating one embodiment of a method for suspending services in a first core network while attached to a second core network.

FIG. 7 depicts a method 700 for suspending services in a first core network while attached to a second core network, according to embodiments of the disclosure. In some embodiments, the method 700 is performed by an apparatus, such as the remote unit 105, the UE 205, and/or the user equipment apparatus 300. In certain embodiments, the method 700 may be performed by a processor executing program code, for example, a microcontroller, a microprocessor, a CPU, a GPU, an auxiliary processing unit, a FPGA, or the like.

The method 700 begins with using a first service (or first set of services) in a first core network of a mobile communication network. Here, a remote unit may be using 705 the first service. The remote unit is configured to communicate with the first core network or a second core network of the mobile communication network. However, wherein remote unit communicates with only one core network at a time. In certain embodiments, the remote unit is a user equipment capable of dual registration with the first and second core networks, but having a transceiver incapable of both dual reception and dual transmission with the first and second core networks. In one embodiment, the first core network is a 5GC, such as the 5GC 210, and the second core network is a EPC, such as the EPC 215. In another embodiment, the first core network is a EPC and the second core network is a 5GC.

The method 700 includes determining 710, at the remote unit, to suspend the first service in order to use a second service (or second set of services) in the second core network. In certain embodiments, a NAS layer in the remote unit receives an internal request (e.g., from an application running on the remote unit) to send packets (e.g., for a service) and determines a need to connect to the second core network. For example, the need to connect to the second network may be due to the requested service not being available in the first core network or due to network/UE policy.

The method 700 includes sending 715 a first mobility management ("MM") message in response to determining to suspend the first service in order to use the second service (or second set of services) in the second core network. Here, the first MM message indicates that the first service (or first set of services) are to be suspended while the remote unit is attached to the second core network. The first services do not include any services transferred to the second core network (or services corresponding to data connections transferred to the second core network).

In some embodiments, sending 715 the first MM message includes transmitting a non-access stratum ("NAS") MM message to the second core network while the remote unit is in an idle state with respect to the first core network. Here, the NAS MM message indicates that a registration with the first core network is not to be cancelled (e.g., due to the remote unit operating in DR-mode). In various embodiments, the first NAS MM message is one of: an attach request, a tracking area update request, and a service request.

In certain embodiments, the first NAS MM message sent to the second core network further includes an indication to suspend the first service (or first set of services) and to preserve one or more data connection contexts associated with the first service. Where determining 710 to suspend the first service in order to use a second service in the second core network includes determining to transfer at least one data connection from the first core network to the second core network, then the NAS MM message may include a request to transfer of the at least one data connection from the first core network to the second core network. Here, the transferred data connection(s) corresponds to a third set of services that are transferred to the second core network.

In some embodiments, sending 715 the first MM message includes transmitting a non-access stratum ("NAS") MM message to the first core network while the remote unit is in a connected state with respect to the first core network. Here, the NAS MM message requests suspension of the first service. In certain embodiments, the NAS MM message includes a cause parameter indicating that the apparatus requires the service in the second core network that is unavailable in the first core network.

The method 700 includes using 720 the second service (or second set of services) in the second core network without using the first service (or first set of services). In certain embodiments, using 720 the second service in the second core network includes initiating a (new) service in the second core network that is unavailable in the first core network and/or transferring to the second core network a third service used in the first core network. In some embodiments, using 720 the second service in the second core network includes preserving data connection contexts associated with the first service while using the second service in the second core network.

In certain embodiments, using 720 the second service in the second core network includes determining to discontinue the second service in the second core network and sending, to the first core network, a second MM message. Here, the second MM message indicates that the first service is to be resumed. In certain embodiments, the second MM message indicates which data connections corresponding to the first service is to be resumed. In various embodiments, the second MM message may be one of: a registration request, a service request, an attach request, and a tracking area update request.

In one embodiment, determining to discontinue the second service in the second core network may include determining to suspend at least one fourth service remaining in the second core network in response to determining to discontinue service in the second core network. In another embodiment, determining to discontinue the second service in the second core network may include determining to transfer at least one fourth service remaining in the second core network to the first core network. Here, resuming use of the first service may further includes using the transferred at least one fourth service in the first core network. The method 700 ends.

Figure 8:
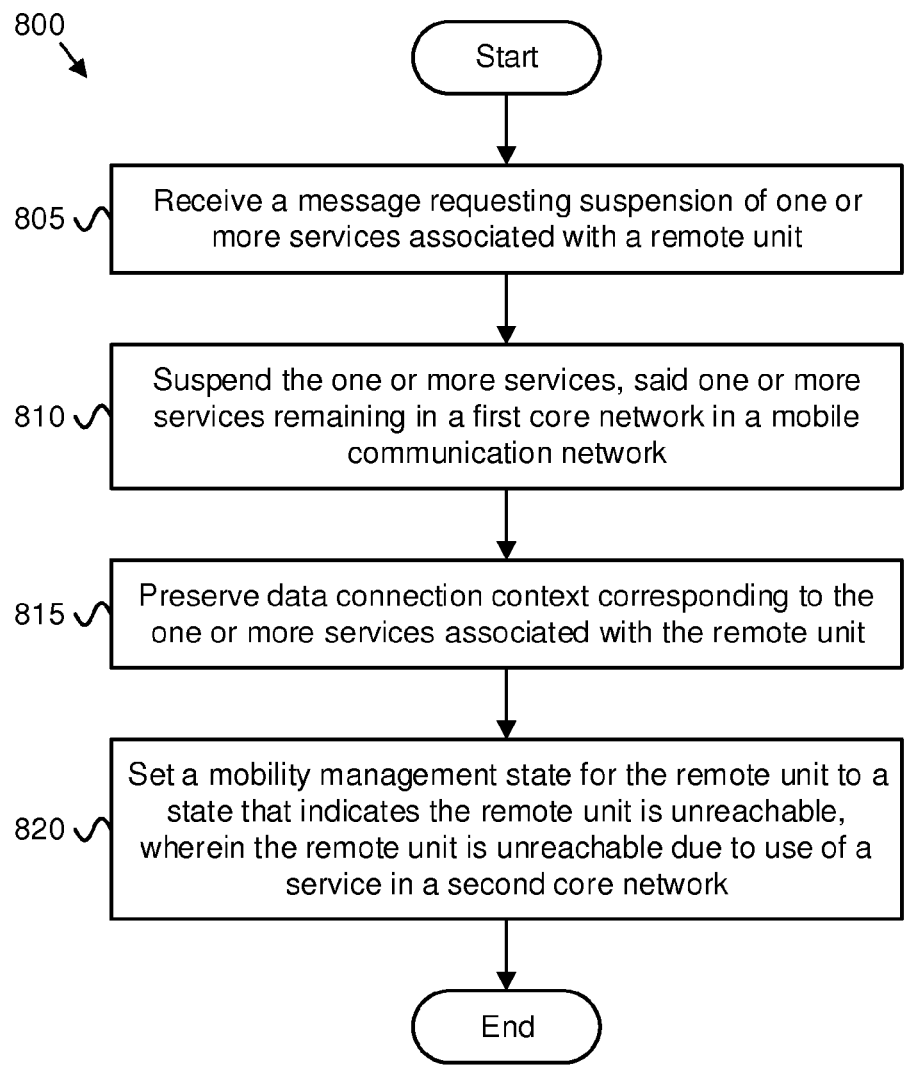
FIG. 8 is a flow chart diagram illustrating another embodiment of a method for suspending services in a first core network while attached to a second core network.

FIG. 8 depicts a method 800 for suspending services in a first core network, according to embodiments of the disclosure. In some embodiments, the method 800 is performed by an apparatus, such as the AMF 135, the AMF 230, the MME 145, the MME 235, and/or the mobility management apparatus 400. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a message requesting suspension of one or more services associated with a remote unit registered with the apparatus. In some embodiments, receiving 805 the message requesting suspension of one or more services includes receiving a subscriber data update notification message from a subscription database common to the first and second core networks.

In some embodiments, receiving 805 the message requesting suspension of one or more services includes receiving a mobility management message from the remote unit. Here, the mobility management message may include a cause parameter, for example, indicating that the remote unit requires a service in the second core network that is unavailable in the first core network. In some embodiments, receiving 805 the message requesting suspension of one or more services includes receiving a resource release request message from a radio access network to which the remote unit is attached. Here, the radio access network requests the suspension due to the remote unit switching to the second core network.

The method includes suspending 810 the one or more services, said one or more services remaining in a first core network in a mobile communication network. Suspending 810 include preserving 815 data connection context corresponding to the one or more services and setting 820 a mobility management state for the remote unit to a state that indicates the remote unit is unreachable. Here, the remote unit is unreachable due to use of a service in a second core network.

In some embodiments, suspending 810 the one or more services includes both releasing a signaling association with the remote unit and releasing user plane network resources in the first core network corresponding to the one or more services associated with the remote unit. These releases occur in response to the message requesting suspension of the one or more services.

In some embodiments, setting 820 the mobility management state for the remote unit to the state that indicates the remote unit is unreachable includes notifying a session management network function in the first core network that the remote unit is unreachable. In certain embodiments, setting 820 the mobility management state for the remote unit to the state that indicates the remote unit is unreachable includes receiving a service request for activating user plane network resources associated with the suspended one or more services and responding with an indication that the remote unit is unreachable. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver configured to register with a first mobile communication network and a second mobile communication network, wherein the transceiver communicates with only one mobile communication network at a time; and
a processor that:
uses a first service in a Connected state in the first mobile communication network; and
determines to release the Connected state to the first mobile communication network;
wherein the transceiver sends a first mobility management ("MM") message to the first mobile communication network, said first MM message comprising a release indication that requests a release of the first connection and paging restrictions, and receives a second message as reply to the first MM message, said second message indicating that the first connection is successfully released.

2. The apparatus of claim 1,
wherein the processor further determines to resume the first service to the first mobile communication network;
wherein the transceiver sends, to the first mobile communication network, a third MM message; and
wherein the processor resumes using the first service in the first mobile communication network in response to the first mobile communication network responding to the third MM message, said third MM message being selected from the group consisting of: a registration request, a service request, an attach request, and a tracking area update request.

3. The apparatus of claim 2, wherein the transceiver sending the third MM message comprises sending a registration request message to the first mobile network.

4. The apparatus of claim 1, wherein the first MM message indicates that the UE is temporarily unreachable in the first mobile communication network.

5. The apparatus of claim 1, wherein the transceiver sending the first MM message comprises the transceiver sending a non-access stratum ("NAS") MM message to the second mobile communication network while in an idle state with respect to the first mobile communication network, said NAS MM message indicating that a registration with the first mobile communication network is not to be cancelled.

6. The apparatus of claim 5, wherein the NAS MM message sent to the second mobile communication network further includes an indication to suspend the first service and that data connection context associated with the first service is to be preserved.

7. The apparatus of claim 1, wherein the transceiver sending the first MM message comprises the transceiver sending a non-access stratum ("NAS") MM message to the first mobile communication network while in a connected state with respect to the first mobile communication network, said NAS MM message requesting release of the NAS connection.

8. The apparatus of claim 7, wherein the NAS MM message includes a cause parameter, said cause parameter indicating that the apparatus requires the service in the second mobile communication network that is unavailable in the first mobile communication network.

9. The apparatus of claim 1, wherein the processor preserves data connection context associated with the first service while using the second service in the second mobile communication network.

10. The apparatus of claim 1, wherein the apparatus is a user equipment capable of dual registration with the first and second mobile communication networks.

11. A method comprising:
registering with a first mobile communication network and a with second mobile communication network;
using a first service in Connected state in a first mobile communication network;
determining, at a remote unit, to release the Connected state to the first mobile communication network, wherein the remote unit communicates with only one mobile communication network at a time;
sending a first mobility management ("MM") message to the first mobile communication network, said first MM message comprising a release indication that requests the release of the first connection and paging restrictions;
receiving a second message as reply to the first MM message, said second message indicating that the first connection is successfully released.

12. The method of claim 11, further comprising:
determining to discontinue the second service resume the first service to the first communication network; and
sending, to the first mobile communication network, a third MM message; and
resuming the first service in response to the first mobile communication network responding to the third MM message, said third MM message being selected from the group consisting of: a registration request, a service request, an attach request, and a tracking area update request.

13. The method of claim 12, wherein sending the third MM message comprises sending the registration request message to the first mobile communication network.

14. The method of claim 12, wherein the first MM message indicates that the UE is temporarily unreachable in the first mobile communication network.

15. The method of claim 11, wherein sending the first MM message comprises transmitting a non-access stratum ("NAS") MM message to the second mobile communication network while in an idle state with respect to the first mobile communication network, said NAS MM message indicating that a registration with the first mobile communication network is not to be cancelled.

16. The method of claim 15, wherein the NAS MM message sent to the second mobile communication network further includes an indication to suspend the first service and to preserve one or more data connection contexts associated with the first service.

17. The method of claim 11, wherein sending the first MM message comprises transmitting a non-access stratum ("NAS") MM message to the first mobile communication network while in a connected state with respect to the first mobile communication network, said NAS MM message requesting release of the NAS connection.

18. The method of claim 17, wherein the NAS MM message includes a cause parameter, said cause parameter indicating that the apparatus requires the service in the second mobile communication network that is unavailable in the first mobile communication network.

19. The method of claim 11, further comprising preserving data connection context associated with the first service while using the second service in the second mobile communication network.

20. The method of claim 11, wherein the remote unit is a user equipment capable of dual registration with the first and second mobile communication networks.

* * * * *